US010548257B2

(12) United States Patent
Koutsorodi et al.

(10) Patent No.: US 10,548,257 B2
(45) Date of Patent: Feb. 4, 2020

(54) PRECISION AGRICULTURE SYSTEM

(71) Applicant: Accenture Global Solutions Limited, Dublin (IE)

(72) Inventors: Artemis Koutsorodi, Chicago, IL (US); Badri Lokanathan, Atlanta, GA (US); Ankur Mathur, Chicago, IL (US); Brandon Webber, Noblesville, IN (US); Gregory P. Spata, West Chester, OH (US); Paul M. Barsamian, Glenview, IL (US); Adalberto Gonzalez Ayala, Santa Catarina (MX)

(73) Assignee: Accenture Global Solutions Limited, Dublin (IE)

( * ) Notice: Subject to any disclaimer, the term of this patent is extended or adjusted under 35 U.S.C. 154(b) by 336 days.

(21) Appl. No.: 15/627,942

(22) Filed: Jun. 20, 2017

(65) Prior Publication Data
US 2018/0027725 A1 Feb. 1, 2018

(30) Foreign Application Priority Data

Jul. 29, 2016 (EP) .................................. 16386015

(51) Int. Cl.
A01B 79/00 (2006.01)
G06Q 50/02 (2012.01)
(Continued)

(52) U.S. Cl.
CPC .......... A01B 79/005 (2013.01); A01C 21/005 (2013.01); G01C 21/00 (2013.01);
(Continued)

(58) Field of Classification Search
CPC .... A01B 79/005; A01C 21/005; G01C 21/00; G01S 19/14; G06Q 10/04; G05B 19/042
(Continued)

(56) References Cited

U.S. PATENT DOCUMENTS

| 2015/0278640 | A1 | 10/2015 | Johnson et al. |
| 2016/0050840 | A1* | 2/2016 | Sauder ................. A01B 79/005 701/3 |
| 2016/0073573 | A1 | 3/2016 | Ethington et al. |
| 2016/0078375 | A1 | 3/2016 | Ethington et al. |
| 2016/0150744 | A1* | 6/2016 | Lin .................. G06Q 10/06313 43/107 |

(Continued)

FOREIGN PATENT DOCUMENTS

EP    3 046 066    7/2016

OTHER PUBLICATIONS

Extended European Search Report corresponding to EP 16386015.8 dated Nov. 7, 2016, 9 pages.

(Continued)

Primary Examiner — Harry K Liu
(74) Attorney, Agent, or Firm — Harrity & Harrity, LLP

(57) ABSTRACT

A device may receive first information associated with an emergence area. The first information may include imagery data of the emergence area. The device may determine an expected commodity quantity value based on the first information. The device may determine an actual commodity quantity value based on the imagery data. The device may determine an emergence value, associated with the emergence area, based on the expected commodity quantity value and the actual commodity quantity value. The device may receive second information associated with a commodity, and may determine one or more conditions based on the second information and the emergence value. The device may determine a recommendation based on the one or more conditions, and may provide the recommendation to permit and/or cause an action to be performed in association with the emergence area.

20 Claims, 27 Drawing Sheets

(51) Int. Cl.
    *G06Q 10/04*         (2012.01)
    *A01C 21/00*        (2006.01)
    *G01C 21/00*        (2006.01)
    *G01S 19/14*         (2010.01)
    *G05B 19/042*       (2006.01)
    *G05D 11/00*        (2006.01)
    *G01S 19/39*         (2010.01)

(52) U.S. Cl.
    CPC ............ *G01S 19/14* (2013.01); *G05B 19/042* (2013.01); *G05D 11/00* (2013.01); *G06Q 10/04* (2013.01); *G06Q 50/02* (2013.01); *G01S 19/39* (2013.01); *G05B 2219/2625* (2013.01); *Y02A 40/12* (2018.01)

(58) Field of Classification Search
    USPC .................................................. 342/357.52
    See application file for complete search history.

(56) References Cited

U.S. PATENT DOCUMENTS

2016/0334276 A1* 11/2016 Pluvinage ............. G01J 3/2823
2018/0293671 A1* 10/2018 Murr ..................... G06F 16/583

OTHER PUBLICATIONS

Gonzalez-Dugo, V., et al., 'Improving the precision of irrigation in a pistachio farm using an unmanned airborne thermal system', Irrigation Science, Jan. 2015, vol. 33, Issue 1, pp. 43-52, [retrieved from the Internet on Nov. 13, 2017] <URL: http://eds.a.ebscohost.com/eds/detail/detail?vid=0&sid=4921d657-50b8-460f-b668-a1b67192811a%essionmgr4008&bdata=JnNpdGU9ZWRzLWxpdmUmc2NvcGU9c2I0ZQ%3d%3d#AN=100209280&db=aph>.

* cited by examiner

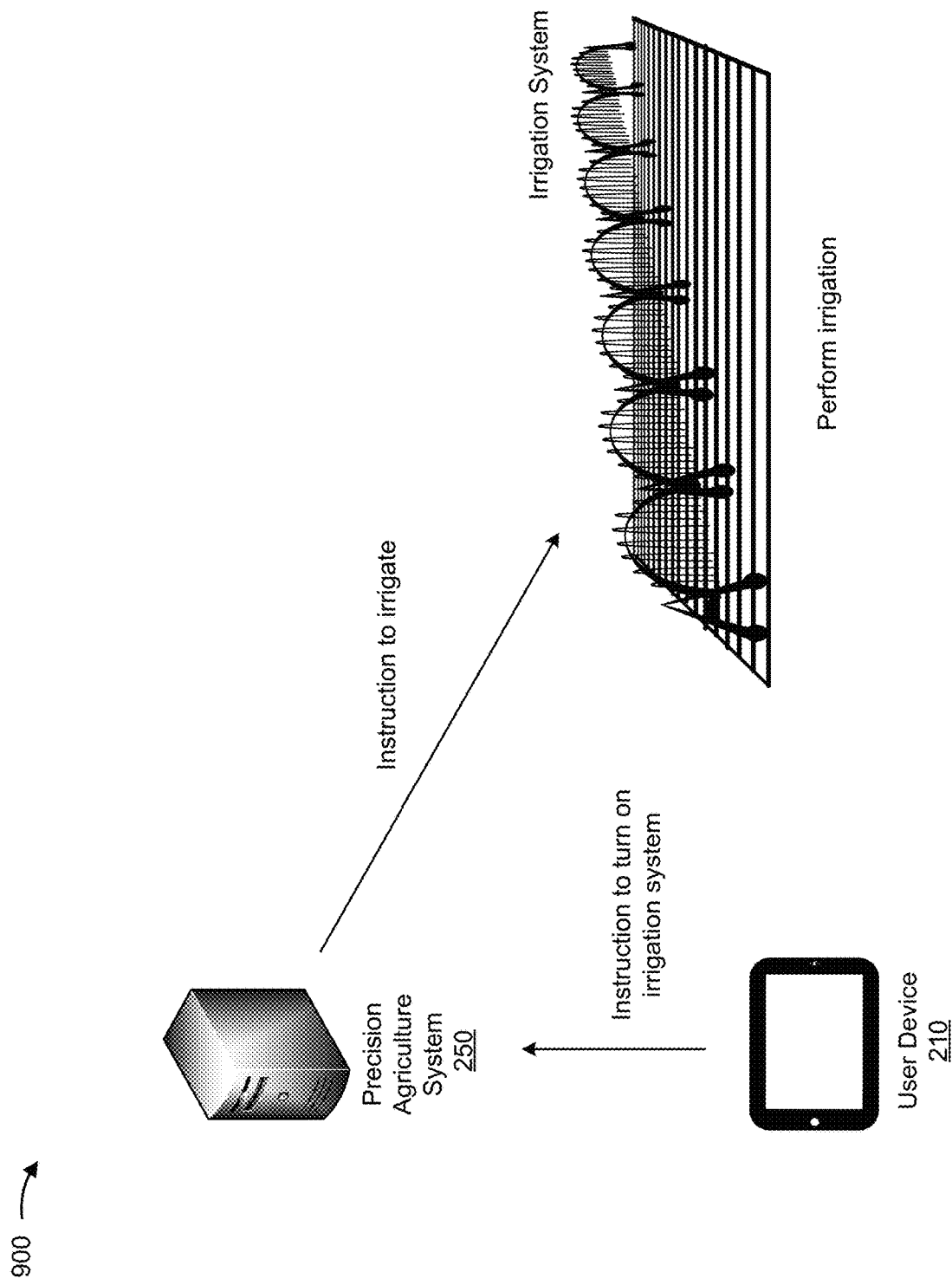

PRECISION AGRICULTURE SYSTEM

RELATED APPLICATION

This application claims priority under 35 U.S.C. § 119 to European Patent Application No. 16386015.8, filed on Jul. 29, 2016, the content of which is incorporated by reference herein in its entirety.

BACKGROUND

During farming operations, a farmer may be required to make an assessment regarding whether to replant problematic areas associated with a field. For example, the farmer may be required to assess a health of a crop emergence associated with a field (e.g., whether the crops are emerging as expected or are emerging in a deficient manner), and determine whether replanting the field will be profitable. The farmer may face difficulty when making such assessments based on variability in market prices associated with the crop, unpredictability of environmental conditions, and/or unpredictability in crop yields.

SUMMARY

In some possible implementations, a device may include one or more processors. The one or more processors may receive first information associated with an emergence area. The first information may include imagery data of the emergence area. The one or more processors may determine an expected commodity quantity value based on the first information. The one or more processors may determine an actual commodity quantity value based on the imagery data. The one or more processors may determine an emergence value, associated with the emergence area, based on the expected commodity quantity value and the actual commodity quantity value. The one or more processors may receive second information associated with a commodity. The one or more processors may determine one or more conditions based on the second information and the emergence value. The one or more processors may determine a recommendation based on the one or more conditions. The one or more processors may provide the recommendation to permit and/or cause an action to be performed in association with the emergence area.

In some possible implementations, a non-transitory computer readable medium may store instructions. The instructions may cause a processor to receive imagery data associated with an emergence area. The instructions may cause the processor to determine an actual commodity quantity value based on the imagery data. The actual commodity quantity value may include a quantity of identified commodities within the imagery data. Each commodity, of the identified commodities, may be associated with a quantity of pixels, relating to the imagery data, that satisfies a first threshold. A pixel, of the quantity of pixels, may include a value that satisfies a second threshold. The instructions may cause the processor to compare the actual commodity quantity value and an expected commodity quantity value. The instructions may cause the processor to determine an emergence value based on comparing the actual commodity quantity value and the expected commodity quantity value. The instructions may cause the processor to provide a recommendation, based on the emergence value, to permit and/or cause an action to be performed in association with the emergence area.

In some possible implementations, a method may include receiving, by a first device and from a second device via a network, information associated with an emergence area of a farm. The information may include imagery data of the emergence area. The method may include determining, by the first device, an expected commodity quantity value based on the information. The method may include determining, by the first device, an actual commodity quantity value based on the imagery data. The method may include determining, by the first device, an emergence value, associated with the emergence area, based on the expected commodity quantity value and the actual commodity quantity value. The method may include causing, by the first device, a third device to perform an action in association with the emergence area based on the emergence value.

BRIEF DESCRIPTION OF THE DRAWINGS

FIGS. 9A-9J are diagrams of an example implementation relating to the example process shown in FIG. 8.

DETAILED DESCRIPTION

The following detailed description of example implementations refers to the accompanying drawings. The same reference numbers in different drawings may identify the same or similar elements.

A user (e.g., a farmer) may wish to make farming decisions based on health assessments of fields and/or crops. For example, the farmer may be faced with the task of determining whether to replant a field based on a quantity of crops that have emerged, a quantity of crops that have not emerged, or the like. However, determining such quantities can be a very time-consuming and/or error prone task for a single farmer. Further, decision making on a farm is often dependent on an understanding of a variety of factors from various information sources. As such, the farmer may make decisions that prove unprofitable for the farmer, that do not improve crop yield, and/or that do not optimize profitability. Implementations described herein enable a precision agriculture system to receive imagery data associated with a farm, identify a quantity of commodities based on the imagery data, compare the identified quantity of commodities and an expected quantity of commodities, and provide a recommendation to permit and/or cause an action to be performed based on the comparison and/or based on other data (e.g., associated with other information sources).

In this way, implementations described herein may alleviate a need of the user to perform searches (e.g., using a user device) for commodity related information, environmental condition related information, and/or other information associated with farming operations, thereby conserving processor and/or memory resources of user devices and/or network resources. Additionally, implementations described herein may reduce a quantity of consumed processor and/or memory resources associated with farming devices (e.g., machinery, unmanned aerial vehicles (UAVs), or the like) based on reducing a quantity of imprudent and/or unnecessary farming operations from being performed.

Figure 1A:
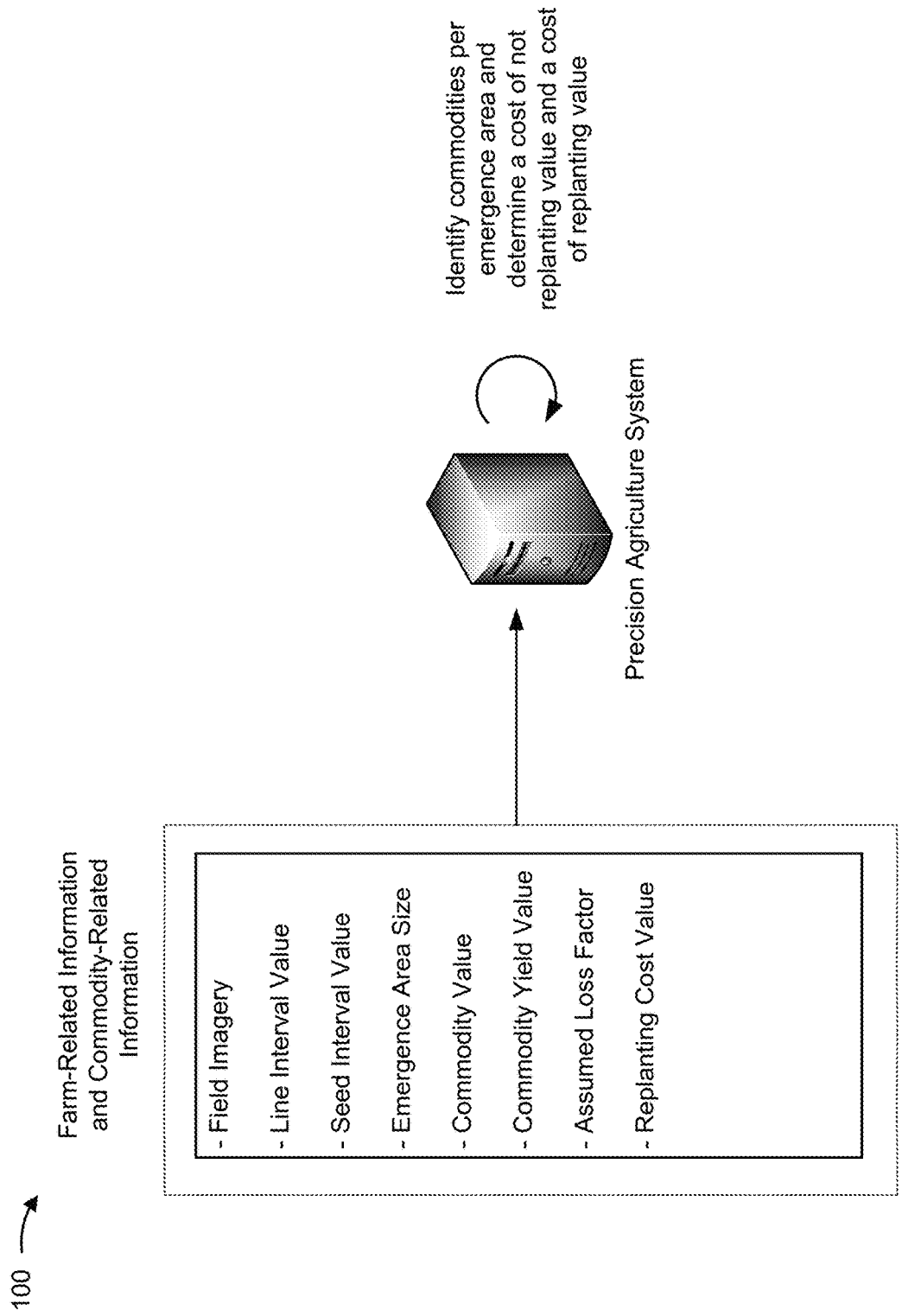
FIGS. 1A-1C are diagrams of an overview of an example implementation described herein.
Figure 1B:
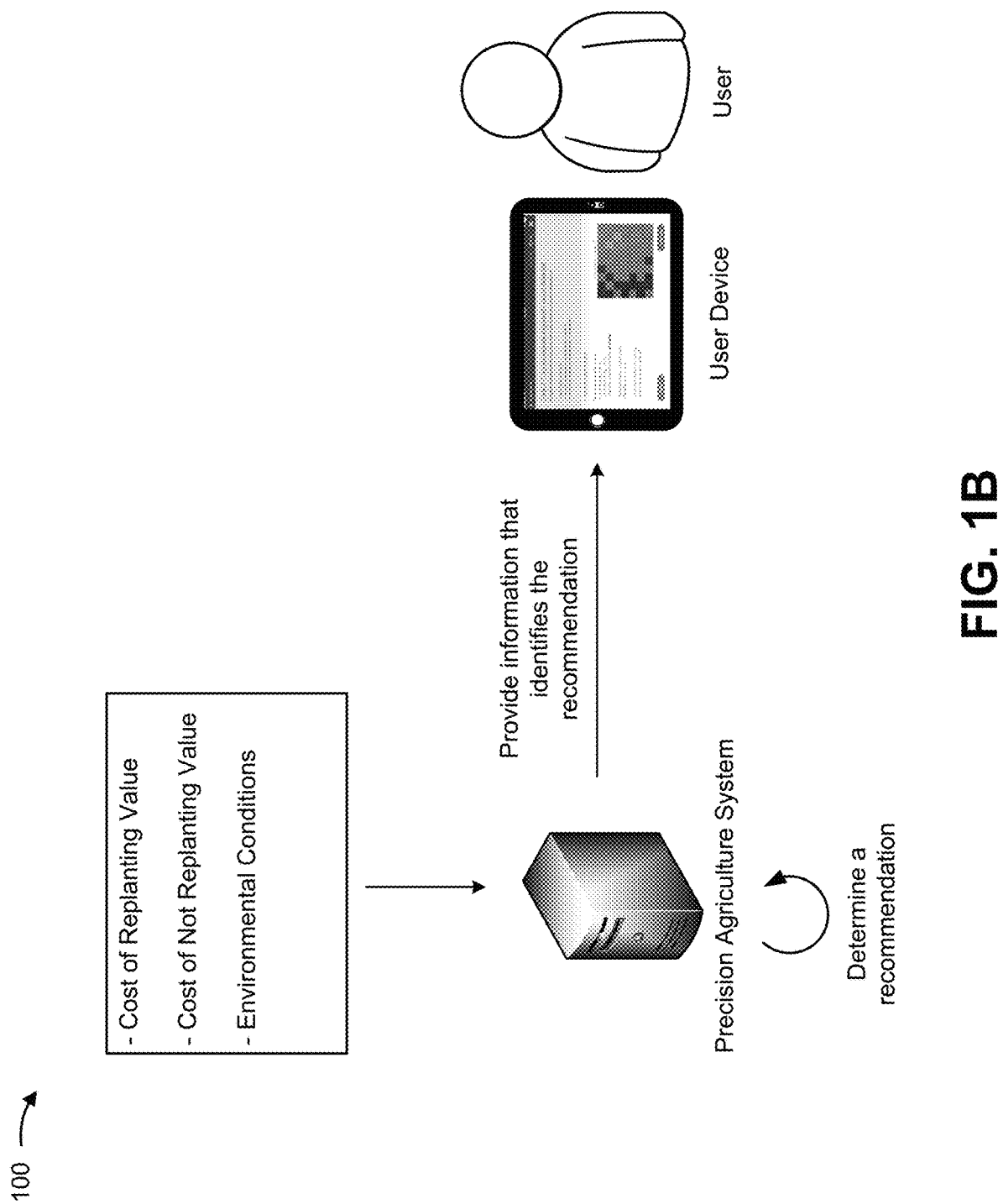
Figure 1C:
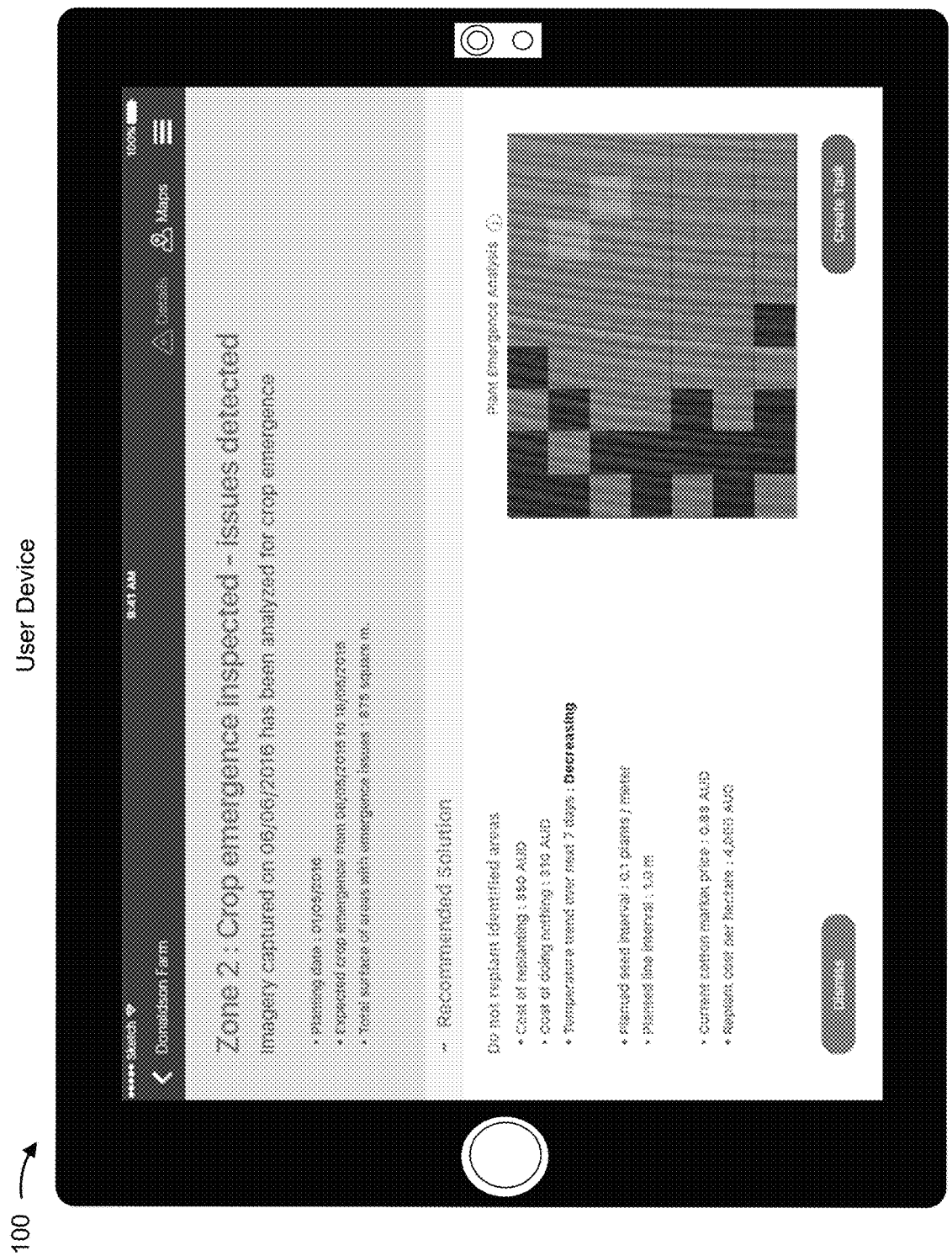

FIGS. 1A-1C are diagrams of an overview of an example implementation 100 described herein. As shown in FIG. 1A, a precision agriculture system may receive farm-related information and/or commodity-related information from various sources. For example, the precision agriculture system may receive information from sensor devices (e.g., cameras associated with UAVs) and/or external data sources (e.g., commodity market data from an external service feed, weather forecast data from a national government or private weather service, input data from a user device, or the like). Additionally, the information may include information relating to multiple emergence areas, such as areas of a field, or the like. For example, the precision agriculture system may receive information associated with a planting process related to a commodity, such as a quantity of seeds planted per emergence area, or the like.

As shown, the precision agriculture system may identify commodities per emergence area (e.g., a quantity of commodities that have emerged in association with an emergence area, a quantity of commodities that have not emerged in association with an emergence area, or the like), and may determine a cost of not replanting value and a cost of replanting value. For example, as described elsewhere herein, the precision agriculture system may perform an image processing technique to identify commodities using imagery data of the emergence areas. Additionally, the precision agriculture system may determine emergence values, associated with the emergence areas, based on comparing actual commodity quantity values and expected commodity quantity values. As described elsewhere herein, the precision agriculture system may identify particular emergence areas that are associated with a low quantity of actual commodities as compared to an expected quantity (e.g., non-emergence areas).

For a particular area (e.g., a field, a zone, etc.), the precision agriculture system may determine a cost of not replanting value that represents a monetary value that may be realized if the non-emergence areas are replanted, and may determine a cost of replanting value that represents a monetary value that may be associated with the replanting process. As an example, the precision agriculture system may determine the cost of not replanting value and/or the cost of replanting value based on a quantity of non-emergence areas, an aggregate surface area of the non-emergence areas, a commodity market price, a replanting cost per particular surface area, or the like.

As shown in FIG. 1B, the precision agriculture system may utilize the cost of replanting value, the cost of not replanting value, and/or environmental condition information (e.g., a forecasted weather condition, drought condition, flood condition, or the like) to determine a recommendation. As an example, assume that the cost of not replanting value is 310 Australian Dollars (AUD), and that the cost of replanting value is 350 AUD. In this case, the precision agriculture system may determine a recommendation that the non-emergence areas should not be replanted (e.g., because the cost of doing so may outweigh the potential profitability). As shown, the precision agriculture system may provide, to a user device, information that identifies the recommendation.

As shown in FIG. 1C, the user device may provide, for display, information that identifies the recommendation and information that identifies the particular areas associated with the emergence areas and/or non-emergence areas. For example, as shown, the user device may provide a graphical representation (e.g., a heat map) that identifies emergence areas associated with a particular area of a farm (e.g., Zone 2). As shown, particular areas may be associated with a particular overlay (e.g., a red overlay) that identifies that the particular areas are non-emergence areas. Additionally, other areas may be associated with another overlay (e.g., a green overlay) that identifies that the other areas are associated with emergence values that indicate that an actual commodity quantity value substantially matches or exceeds an expected commodity quantity value. Additionally, as shown, the user device may provide, for display, information that identifies the recommendation. In this way, a user may identify and assess an overall health of a particular area of the farm based on the graphical representation, and/or may identify whether to perform a particular action based on the recommendation. Implementations described herein may conserve processor and/or memory resources of user devices and/or farming devices based on reducing a need of the user to cause a user device to perform searches for such information, and/or by reducing a quantity of imprudent farming operations.

As indicated above, FIGS. 1A-1C are provided merely as an example. Other examples are possible and may differ from what was described with regard to FIGS. 1A-1C.

While some implementations described herein are described in terms of identifying commodities associated with a farm, implementations described herein may be applied to identifying other objects associated with other areas. In practice, these implementations may be applied to identifying other objects and generating recommendations to permit and/or cause other actions to be performed based on the other objects.

Figure 2:
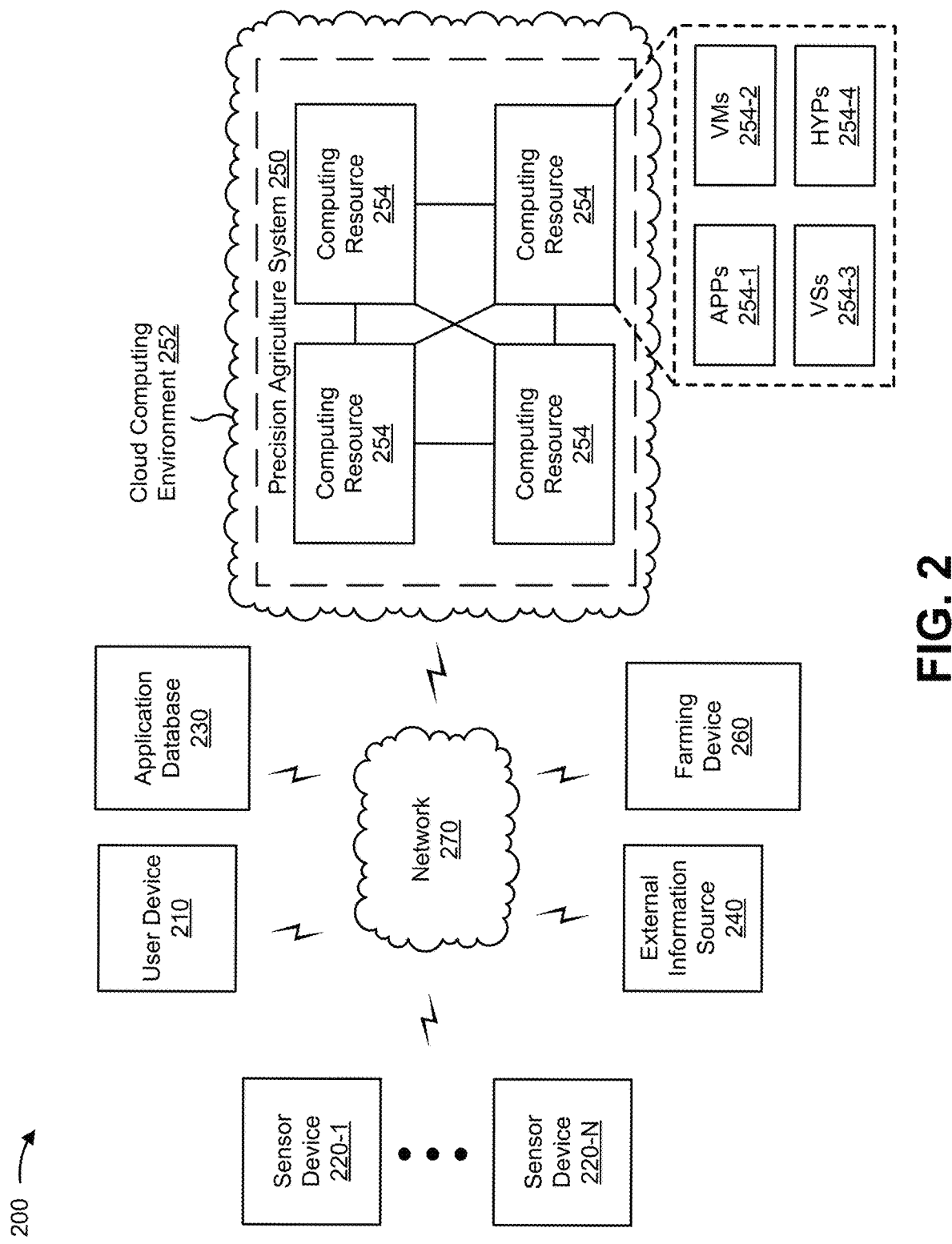
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include user device 210, one or more sensor devices 220-1 through 220-N(N≥1) (hereinafter referred to collectively as "sensor devices 220," and individually as "sensor device 220"), an application database 230, an external information source 240, a precision agriculture system (PAS) 250, a farming device 260, and a network 270. Devices of environment 200 may interconnect via wired connections, wireless connections, or a combination of wired and wireless connections.

User device 210 includes one or more devices capable of receiving, generating, storing, processing, and/or providing information associated with a precision agriculture system. For example, user device 210 may include a computing device (e.g., a desktop computer, a laptop computer, a tablet computer, a handheld computer, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to precision agriculture system 250. In some implementations, user device 210 may include a precision agriculture system (PAS) application that provides information (e.g., sensor information, environmental information, aerial imagery, yield projections, financial information, etc.), recommendations based on such information and, if appropriate, information that permits and/or causes an action to be performed (e.g., automatically and/or based on a user input).

Sensor device 220 includes one or more devices for obtaining sensor-related information. For example, sensor device 220 may include a camera (e.g., a visual spectrum imaging camera, an infrared or near infrared imaging camera, a multispectral imaging camera, a hyperspectral imaging camera, a thermal imaging camera, a laser mapping imagery camera, etc.), a sonar device capable of generating sonar-generated mapping imagery, a sensor capable of detecting precipitation, a sensor capable of detecting sunshine, a sensor capable of detecting relative humidity, a sensor capable of detecting atmospheric pressure, a sensor capable of detecting temperature above ground, a sensor capable of detecting temperature at one or more depths below ground, a sensor capable of detecting wind direction, a sensor capable of detecting wind speed, a sensor capable of detecting rainfall, a sensor capable of detecting irrigation flow, a sensor capable of detecting soil moisture, a sensor capable of detecting soil salinity, a sensor capable of detecting soil density, a sensor capable of detecting sap flow, a sensor capable of detecting equipment operating parameters, a sensor capable of detecting a silo fill level, a sensor capable of detecting a truck fill level, and/or any other sensor that would aid in making operational farming decisions. In some implementations, sensor device 220 may include or be attached to a UAV, an item of farming equipment (e.g., a tractor, an irrigation system, or the like), a tower (e.g., a cell tower or the like), or another type of device/vehicle.

Application database 230 includes one or more devices capable of receiving, generating, storing, processing, and/or providing information associated with a precision agriculture system. For example, application database 230 may include a computing device, such as a server, a desktop computer, a laptop computer, a tablet computer, a handheld computer, or a similar device. Application database 230 may store information from a variety of sources and from multiple farms. For example, the information may include information from sensor devices 220 (e.g., field imagery, telemetry, crop growth information, etc.), information from external information source 240 (e.g., environmental condition information, financial market information, etc.), information relating to operations of a farm (e.g., actions taken based on recommendations, whether the actions resulted in fixing any identified problems, historical field data, past outcomes, etc.), and/or another type of information that may aid in determining actions to perform in relation to the operation of a farm.

External information source 240 includes one or more devices, accessible through a network, that are sources of information relevant to agricultural decision making. For example, external information source 240 may include a server that provides Doppler weather forecasts, a server that provides satellite imagery, a server that performs image processing techniques (e.g., orthorectification, image stitching, georeferencing, or the like), a server that provides vegetation and soil indexes, a server that provides seed/genetic data from manufacturers, a server that provides market data for specific crops, the United States Department of Agriculture (USDA) "soil type" database, weather forecast data from a national government or private weather services, a server that provides cloud based image processing to build crop health indices (e.g., such as Normalized Difference Vegetation Index (NDVI) images), a server that provides financial data relating to crops, a device via which a farmer provides best practice information, a device via which an agronomist provides farming-related information, and/or any other type of device that provides information that may aid in determining actions to perform in relation to the operation of a farm.

Precision agriculture system 250 includes one or more devices capable of receiving imagery data associated with an emergence area, determining emergence values, and/or determining recommendations based on the emergence values, as described elsewhere herein. In some implementations, precision agriculture system 250 may receive information for controlling sensor devices 220 and/or farming devices 260 (e.g., network addresses). For example, precision agriculture system 250 may include a cloud server or a group of cloud servers. In some implementations, precision agriculture system 250 may be designed to be modular such that certain software components can be swapped in or out depending on a particular need. As such, precision agriculture system 250 may be easily and/or quickly reconfigured for different uses.

In some implementations, as shown, precision agriculture system 250 may be hosted in cloud computing environment 252. Notably, while implementations described herein describe precision agriculture system 250 as being hosted in cloud computing environment 252, in some implementations, precision agriculture system 250 may not be cloud-based (i.e., may be implemented outside of a cloud computing environment) or may be partially cloud-based.

Cloud computing environment 252 includes an environment that hosts precision agriculture system 250. Cloud computing environment 252 may provide computation, software, data access, storage, etc. services that do not require end-user (e.g., user device 210) knowledge of a physical location and configuration of system(s) and/or device(s) that hosts precision agriculture system 250. As shown, cloud computing environment 252 may include a group of computing resources 254 (referred to collectively as "computing resources 254" and individually as "computing resource 254").

Computing resource 254 includes one or more personal computers, workstation computers, server devices, or other types of computation and/or communication devices. In some implementations, computing resource 254 may host precision agriculture system 250. The cloud resources may include compute instances executing in computing resource 254, storage devices provided in computing resource 254, data transfer devices provided by computing resource 254, etc. In some implementations, computing resource 254 may communicate with other computing resources 254 via wired connections, wireless connections, or a combination of wired and wireless connections.

As further shown in FIG. 2, computing resource 254 includes a group of cloud resources, such as one or more applications ("APPs") 254-1, one or more virtual machines ("VMs") 254-2, virtualized storage ("VSs") 254-3, one or more hypervisors ("HYPs") 254-4, or the like.

Application 254-1 includes one or more software applications that may be provided to or accessed by client device 205. Application 254-1 may eliminate a need to install and execute the software applications on client device 205. For example, application 254-1 may include software associated with precision agriculture system 250 and/or any other software capable of being provided via cloud computing environment 252. In some implementations, one application 254-1 may send/receive information to/from one or more other applications 254-1, via virtual machine 254-2.

Virtual machine 254-2 includes a software implementation of a machine (e.g., a computer) that executes programs like a physical machine. Virtual machine 254-2 may be either a system virtual machine or a process virtual machine, depending upon use and degree of correspondence to any real machine by virtual machine 254-2. A system virtual machine may provide a complete system platform that supports execution of a complete operating system ("OS"). A process virtual machine may execute a single program, and may support a single process. In some implementations, virtual machine 254-2 may execute on behalf of a user (e.g., client device 205), and may manage infrastructure of cloud computing environment 252, such as data management, synchronization, or long-duration data transfers.

Virtualized storage 254-3 includes one or more storage systems and/or one or more devices that use virtualization techniques within the storage systems or devices of computing resource 254. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 254-4 may provide hardware virtualization techniques that allow multiple operating systems (e.g., "guest operating systems") to execute concurrently on a host computer, such as computing resource 254. Hypervisor 254-4 may present a virtual operating platform to the guest operating systems, and may manage the execution of the guest operating systems. Multiple instances of a variety of operating systems may share virtualized hardware resources.

Farming device 260 includes one or more devices that provide a service at a farm. For example, farming device 260 may include an irrigation system, a tractor, a device associated with soil cultivation (e.g., a cultivator), a device relating to planting (e.g., an air seeder), a device relating to spraying an insecticide or another fluid (e.g., a sprayer), a device relating to fertilizing (e.g., a fertilizer spreader), a device relating to harvesting (e.g., a harvester), a UAV, a farm worker scheduling system, and/or another similar type of device. In some implementations, farming device 260 may receive information from precision agriculture system 250 and perform an action based on receiving the information. For example, in the situation where farming device 260 is an air seeder, the air seeder may receive information from precision agriculture system 250 and plant a particular portion of a plot of the farm based on the received information.

Network 270 includes one or more wired and/or wireless networks. For example, network 270 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
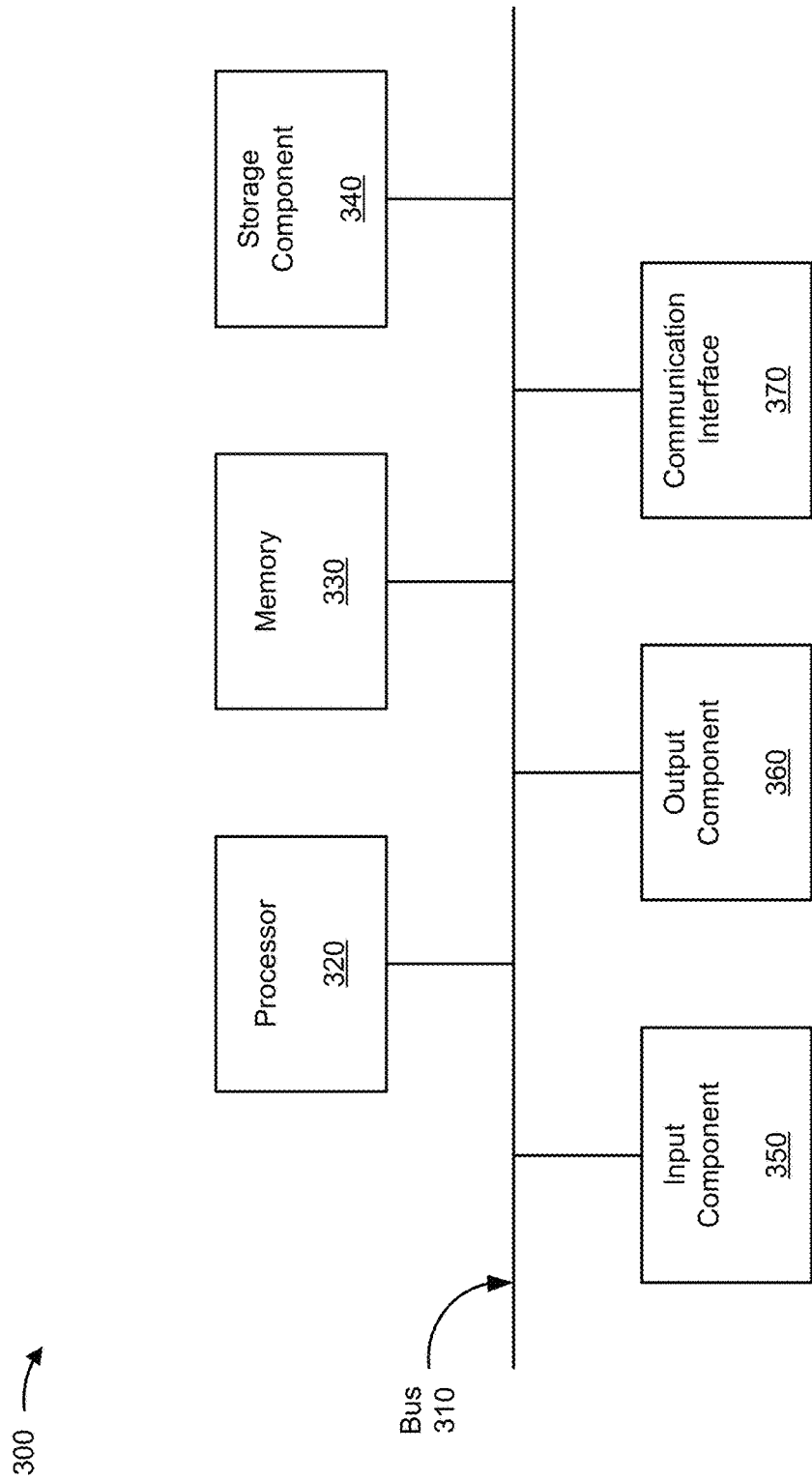
FIG. 3 is a diagram of example components of one or more devices of FIG. 2.

FIG. 3 is a diagram of example components of a device 300. Device 300 may correspond to user device 210, sensor device 220, application database 230, external information source 240, precision agriculture system 250, and/or farming device 260. In some implementations, user device 210, sensor device 220, application database 230, external information source 240, precision agriculture system 250, and/or farming device 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
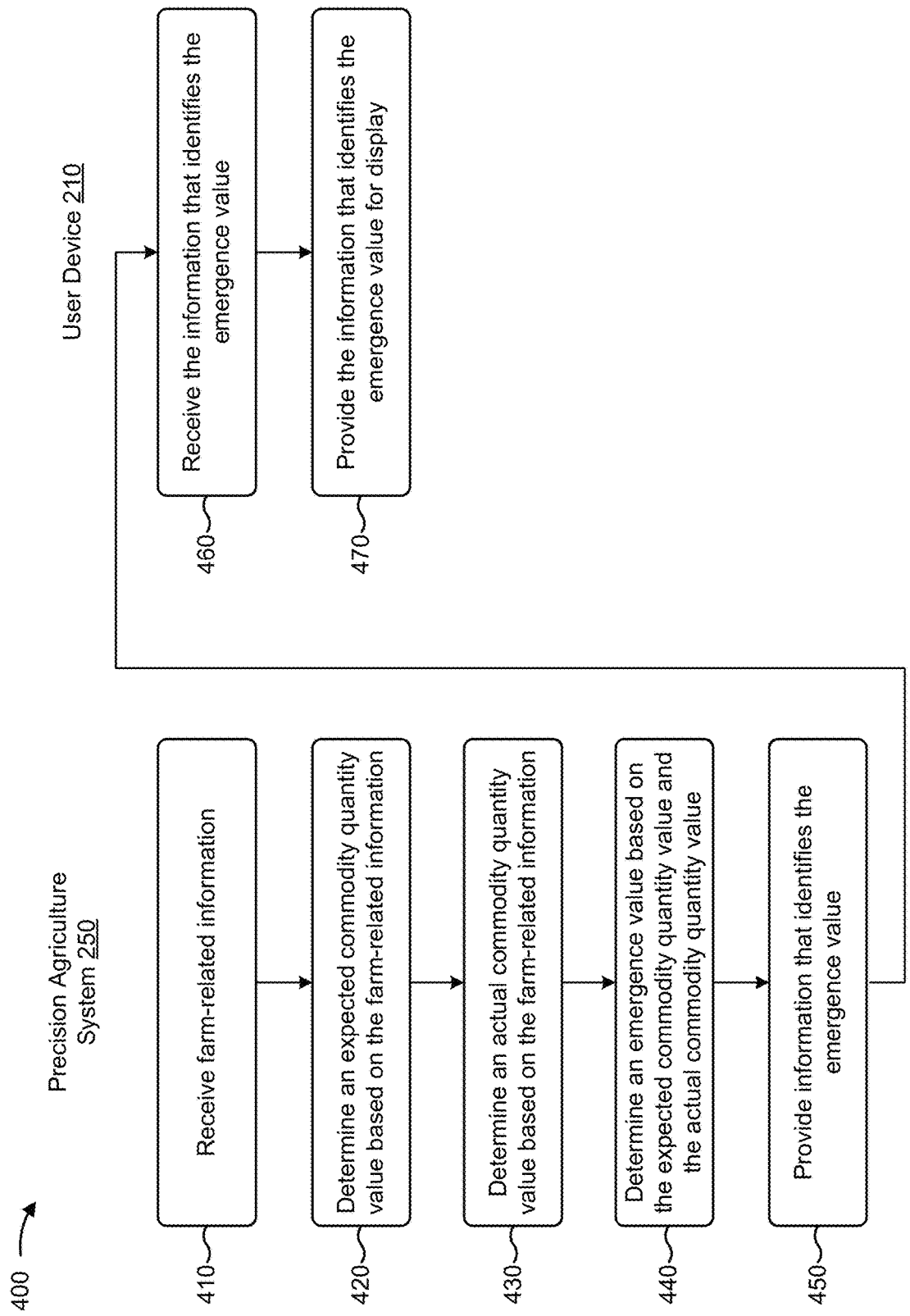
FIG. 4 is a flow chart of an example process for determining an emergence value associated with a commodity.

FIG. 4 is a flow chart of an example process 400 for determining an emergence value associated with a commodity. In some implementations, one or more process blocks of FIG. 4 may be performed by precision agriculture system 250 and/or user device 210. In some implementations, one or more process blocks of FIG. 4 may be performed by another device or a group of devices separate from or including precision agriculture system 250 and/or user device 210, such as sensor device 220, application database 230, external information source 240, and/or farming device 260.

As shown in FIG. 4, process 400 may include receiving farm-related information (block 410). For example, precision agriculture system 250 may receive farm-related information to identify an emergence value associated with a commodity. In some implementations, the farm-related information may include information relating to a farm in general, such as an overall size of the farm (e.g., a surface area of the farm, such as a quantity of hectares, acres, etc.), a geographic location of the farm, a quantity of fields associated with the farm, a quantity of zones associated with each field, respective sizes and/or geographic locations of the fields and/or corresponding zones, commodities associated with each field and/or zone, and/or other similar types of information. In some implementations, precision agriculture system 250 may receive the farm-related information from user device 210 (e.g., which may have received an input from a user), sensor devices 220, application database 230, external information source 240, and/or farming device 260.

As used herein, a commodity may include a fungible agricultural product (e.g., a crop, such as cotton, corn, wheat, soy, tobacco, rice, canola, oat, etc.). In some implementations, a farm may be associated with multiple fields (e.g., areas where commodities may be planted, harvested, etc.). Additionally, or alternatively, a field may be associated with multiple zones (e.g., a subset area of the field). In some implementations, a field may be associated with one or more commodities (e.g., multiple commodities may be planted, harvested, etc. in association with a field and/or one or more zones associated with the field). In some implementations, an emergence value may include a value that identifies a relationship between an expected commodity value and an actual commodity value, as described elsewhere herein. In some implementations, an emergence value may be associated with an emergence area. As used herein, an emergence area may include a farm, a field, a zone, and/or a particular subset area of a farm, field, zone, or the like.

In some implementations, the farm-related information may include imagery data. The imagery data may include, for example, satellite imagery on the Red/Green/Blue (RGB) spectrum (i.e., each image dot corresponds to a value of red, green, or blue to recreate a color observable by the human eye), satellite imagery on multiple spectral bands (e.g., near infrared (NIR), infrared (IR), and/or similar spectral bands), satellite hyperspectral imagery, aerial imagery (e.g., taken by planes, UAVs, etc.) on the RGB, thermal, or NIR spectrum, aerial imagery (e.g., taken by planes, UAVs, etc.) on multiple spectral bands, aerial hyperspectral imagery, sonar-generated imagery, geographical features described through coordinates, as boundaries, polygons, or dots, and/or ground-level imagery (e.g., RGB, infrared, thermal, multispectral, hyperspectral, laser, etc.) taken by users, which may be geo-located and uploaded to precision agriculture system 250.

In some implementations, the imagery data may be associated with a particular emergence area. For example, the imagery data may include information that identifies a farm (e.g., a farm identifier), a field (e.g., a field identifier), a zone (e.g., a zone identifier), an emergence area (e.g., an emergence area identifier), a time at which the imagery data was captured (e.g., a timestamp), or the like. In some implementations, the imagery data may be associated with a ground sample distance (GSD) value. For example, a GSD value may represent a relationship between a size of a pixel, of the imagery data, and a corresponding surface area of a physical object associated with the imagery data. As an example, a GSD of one square centimeter indicates that a pixel, of the imagery data, represents one square centimeter of the physical object associated with the imagery data.

In some implementations, the farm-related information may include a line interval value. A line interval value may include a distance between lines associated with an emergence area. A line may include a portion of an emergence area where seeds may be planted. As an example, farming device 260 (e.g., an air seeder, a harvester, a grain drill, a planter, etc.) may perform a seed planting process (e.g., a sowing process, such as a ridge sowing process) whereby seeds, associated with a commodity, are planted in association with a line (e.g., a trench, a row, a trough, or the like).

In some implementations, the farm-related information may include a seed interval value. A seed interval value may include a distance between seeds associated with a particular line. For example, farming device 260 may perform the seed planting process and may plant seeds, associated with a particular line, at a particular interval (e.g., spacing). In some implementations, farming device 260 may plant seeds in a grid formation (e.g., in association with a particular spacing between lines, and a particular spacing between seeds associated with each line). In some implementations, a line interval value and/or a seed interval value may be associated with a particular emergence area, and/or based on particular commodity. Additionally, or alternatively, a line interval value and/or a seed interval value may be associated with a particular time frame (e.g., a month, a season, etc.). For example, precision agriculture system 250 may receive information that identifies different line interval values and/or seed interval values, that may be used during farming operations, based on a time of the year and/or based on a particular emergence area.

In some implementations, the farm-related information may include a commodity size threshold value. A commodity size threshold value may include a threshold size (e.g., a maximum or minimum length, width, height, diameter, etc.) associated with a commodity. For example, precision agriculture system 250 may utilize the commodity size threshold value when identifying potential commodities and/or identifying commodities, as described elsewhere herein.

In some implementations, the farm-related information may include a planting date value. A planting date value may include a particular date, a particular time, etc. at which seeds may be planted. Additionally, or alternatively, the farm-related information may include an expected emergence start date value that identifies a particular time and/or date at which commodity emergence (e.g., sprouting, growing, etc.) may be expected (e.g., five days, ten days, a month, etc.) after the planting date value. Additionally, or alternatively, the farm-related information may include an expected emergence end date value that identifies a particular time and/or date at which commodity emergence may be expected to be completed (e.g., fourteen days, twenty days, etc. after the planting date). In some implementations, precision agriculture system 250 may utilize the planting date, expected emergence start date, and/or expected emergence end date value(s) when identifying potential commodities and/or identifying commodities, as described elsewhere herein.

In some implementations, the farm-related information may include, for example, data relating to precipitation, sunshine, relative humidity, atmospheric pressure, moisture, sap flow, temperature above and below ground, temperature at different depths, wind direction and speed, irrigation flow, equipment operating parameters (e.g., voltage, power outputs, etc.), equipment errors (e.g., radio error rates, delays, etc.), commodity prices (e.g., soy, corn, etc.), and/or fill levels (e.g., of silos, trucks, etc.).

In some implementations, the farm-related information may include environmental condition information. The environmental condition information may include information relating to the current weather, information related to historical weather, and/or information relating to weather forecasts. In some implementations, the farm-related information may include data from a server that provides Doppler weather forecasts or historical weather information, a server that provides image data and or agricultural index data from government and/or academic sources, a server that provides market data for specific commodities, the USDA "soil type" database, a server that provides historical growth trends for particular commodities, farmers (e.g., data relating to best practices for running a farm), agronomists, and/or another source. In some implementations, the farm-related information may include current data, historical data, and/or predicted data.

In some implementations, precision agriculture system 250 may receive the farm-related information directly from sensor devices 220 and/or external information sources 240. In some implementations, precision agriculture system 250 may receive the farm-related information from application database 230. In either event, the farm-related information may include raw data (e.g., data in various units of measure). In some situations, precision agriculture system 250 may receive farm-related information in real time or near real time (e.g., as compared to a time of collection by sensor devices 220). In some implementations, precision agriculture system 250 may receive farm-related information at particular time intervals (e.g., once an hour, once a day, once a week, or the like). In some implementations, precision agriculture system 250 may receive the farm-related information passively. In some implementations, precision agriculture system 250 may receive the farm-related information based on requesting the farm-related information from a particular source (e.g., from a sensor device 220 and/or from an external information source 240). Additionally, or alternatively, precision agriculture system 250 may request farm-related information based on a request from user device 210.

In this way, precision agriculture system 250 may receive farm-related information, which may be used to determine expected commodity quantity values and actual commodity quantity values, as described elsewhere herein. Additionally, in this way, precision agriculture system 250 may utilize information from various sources, which may improve accuracy of farming related decisions. In this way, processor and/or memory resources of farming devices 260 may be conserved based on reducing imprudent farming operations. Additionally, processor and/or memory resources of user devices 210 (e.g., associated with a farmer) and/or network resources may be conserved by reducing a quantity of searches for information (e.g., farm-related information, environmental condition information, etc.) that may be performed.

As further shown in FIG. 4, process 400 may include determining an expected commodity quantity value based on the farm-related information (block 420). For example, precision agriculture system 250 may determine an expected commodity quantity value based on a line interval value, a seed interval value, size information associated with an emergence area, or the like. An expected commodity quantity value may include a value that identifies a quantity of commodities (e.g., individual crops) that are expected to emerge (e.g., grow, sprout, be harvested, produce a yield, etc.) in association with a particular emergence area.

In some implementations, precision agriculture system 250 may determine an expected commodity quantity value based on a size (e.g., an acreage) of an emergence area. For example, precision agriculture system 250 may identify a quantity of seeds (e.g., planted seeds) associated with the emergence area based on a line interval value, a seed interval value, and/or the size (e.g., surface area) of the emergence area. In some implementations, the expected commodity quantity value may be associated with a particular quantity of seeds associated with the emergence area (e.g., may correspond to the quantity of planted seeds). Alternatively, an expected commodity quantity value may be associated with a particular quantity of seeds and an assumed loss factor. For example, an assumed loss factor may identify a percentage, a quantity, etc. of seeds that are expected to not emerge, not produce a yield, etc.

In some implementations, precision agriculture system 250 may determine an expected commodity quantity value based on a model. For example, precision agriculture system 250 may use machine learning techniques to analyze data (e.g., training data, such as historical data, etc.) and create models. The machine learning techniques may include, for example, supervised and/or unsupervised techniques, such as artificial networks, Bayesian statistics, learning automata, Hidden Markov Modeling, linear classifiers, quadratic classifiers, decision trees, association rule learning, or the like. In some implementations, precision agriculture system 250 may receive information that identifies historical commodity quantity values per emergence areas, and may analyze the information to generate an expected commodity quantity value. In some implementations, precision agriculture system 250 may use another kind of computer-implemented technique, such as artificial intelligence, machine perception, or computer vision, to analyze data and determining an expected commodity quantity value. In some implementations, precision agriculture system 250 may create a model using information associated with a first farm (e.g., training data), and may use the model in association with information relating to a second farm.

In some implementations, precision agriculture system 250 may determine an expected commodity quantity value based on a time frame. For example, precision agriculture system 250 may identify a planting date value, and may determine the expected commodity quantity value based on the planting date value. As an example, precision agriculture system 250 may determine a first expected commodity quantity value for a first date (e.g., ten days after the planting date) and may determine a second expected commodity quantity value (e.g., that is greater than the first expected commodity quantity value) for a second date (e.g., fourteen days after the planting date). Additionally, or alternatively, precision agriculture system 250 may determine an expected commodity quantity value based on a time and/or date (e.g., a month, a season, etc.).

As further shown in FIG. 4, process 400 may include determining an actual commodity quantity value based on the farm-related information (block 430). For example, precision agriculture system 250 may determine an actual commodity quantity value per an emergence area. An actual commodity quantity value may include a quantity of identified commodities associated with an emergence area (e.g., a quantity of crops that have emerged in association with an emergence area).

As described in more detail in connection with FIG. 6, precision agriculture system 250 may determine an actual commodity quantity value based on performing one or more image processing techniques. For example, precision agriculture system 250 may receive imagery data, associated with an emergence area, and may determine the actual commodity quantity value based on the imagery data. In some implementations, precision agriculture system 250 may determine an actual commodity quantity value in association with an emergence area. Additionally, or alternatively, precision agriculture system 250 may identify particular locations (e.g., coordinate locations) associated with each actual commodity of the emergence area.

In some implementations, precision agriculture system 250 may determine a non-emergence value associated with an emergence area. For example, a non-emergence value may refer to a quantity of commodities that did not emerge. In some implementations, precision agriculture system 250 may determine, using a line interval value and a seed interval value, an absence of an expected commodity. In other words, precision agriculture system 250 may detect that a commodity, that was expected to emerge, did not emerge. In some implementations, precision agriculture system 250 may identify particular locations associated with each commodity that did not emerge in association with an emergence area (e.g., coordinate locations where commodities were expected to emerge and did not emerge).

In this way, precision agriculture system 250 may compare the actual commodity quantity value and the expected commodity quantity value, and may determine an emergence value, as described below.

As further shown in FIG. 4, process 400 may include determining an emergence value based on the expected commodity quantity value and the actual commodity quantity value (block 440). For example, precision agriculture system 250 may determine an emergence value based on comparing the actual commodity quantity value and the expected commodity quantity value. An emergence value may include a value that relates the actual commodity quantity value and the expected quantity value. For example, the emergence value may include a value (e.g., a quantity, a percentage, or the like), a designation (e.g., "green," "yellow," "orange," "red," etc.), or the like.

In some implementations, precision agriculture system 250 may determine the emergence value based on comparing the actual commodity quantity value and the expected quantity value (or dividing the actual commodity quantity value by the expected quantity value). Additionally, or alternatively, precision agriculture system 250 may determine whether the emergence value and/or the actual commodity quantity value satisfy a threshold.

In some implementations, precision agriculture system 250 may determine the emergence value based on comparing an expected quantity value and a non-emergence value. Additionally, or alternatively, precision agriculture system 250 may determine the emergence value based on an actual commodity value, an expected commodity value, and a non-emergence value.

In some implementations, precision agriculture system 250 may determine an emergence issue based on the emergence value. For example, an emergence issue may identify whether an issue (e.g., an insufficient quantity of commodities have emerged, or the like) exists in association with an emergence area. Additionally, or alternatively, precision agriculture system 250 may determine an emergence issue based on a non-emergence value, an actual commodity value, or the like.

As described elsewhere herein, precision agriculture system 250 may utilize information associated with an emergence issue when determining conditions, and/or generating recommendations. In some implementations, precision agriculture system 250 may determine an emergence issue based on the emergence value. For example, precision agriculture system 250 may determine whether the emergence value satisfies a threshold. As an example, assume that the emergence value is 90% (e.g., indicating that 90% of the expected commodities emerged). In this case, precision agriculture system 250 may determine that an emergence issue does not exist in association with the emergence area (e.g., because the emergence value satisfies a threshold of 60%). Alternatively, as another example, assume that the emergence value is 40%. In this case, precision agriculture system 250 may determine that an emergence issue exists in association with the emergence area. Additionally, or alternatively, precision agriculture system 250 may assign a severity level to an emergence issue (e.g., may assign a severity level of "red" to emergence values in a first particular range, such as 0-30%; a severity level of "yellow" to emergence values in a second particular range, such as 30-60%; and a severity level of "green" to emergence values in a third particular range, such as 60-100%).

In some implementations, precision agriculture system 250 may determine a non-emergence area based on an emergence issue. As used herein, a non-emergence area may include an emergence area that includes an emergence value that satisfies a threshold. In some implementations, a non-emergence area may be associated with an emergence issue (e.g., identifying that an emergence value associated with the non-emergence area satisfies a threshold).

In this way, precision agriculture system 250 may identify particular emergence areas that are associated with emergence issues. Additionally, in this way, precision agriculture system 250 may provide information that identifies the particular emergence areas, thereby reducing a need to replant areas other than the particular emergence area (e.g., that are not associated with emergence issues), which may conserve processor and/or memory resources of farming devices 260.

As further shown in FIG. 4, process 400 may include providing information that identifies the emergence value (block 450). For example, precision agriculture system 250 may provide, to user device 210, information that identifies an emergence value, an emergence issue, and/or a severity level associated with an emergence area. As an example, precision agriculture system 250 may provide information (e.g., a JavaScript Object Notation (JSON) file) to user device 210 that identifies the emergence area (e.g., includes imagery data, geographical coordinates, etc.), identifies the emergence value, identifies an emergence issue, identifies a severity level, identifies the quantity of actual commodities, identifies locations of the actual commodities (e.g., geographical coordinates), or the like. In this way, user device 210 may provide the information for display (e.g., to notify a user of potential issues associated with an emergence area), as described below.

In some implementations, precision agriculture system 250 may provide the information based on determining the emergence value (e.g., based on determining that the emergence value satisfies a threshold, based on determining a particular emergence issue, based on determining a particular severity level, etc.), based on receiving a request for the information (e.g., from user device 210), based on a time frame (e.g., every day, every week, every month, etc.), based on a particular time (e.g., based on a planting date, based on an expected emergence start date value, based on an expected emergence end date value, or the like), or the like.

As further shown in FIG. 4, process 400 may include receiving the information that identifies the emergence value (block 460), and providing the information that identifies the emergence value for display (block 470). For example, user device 210 may receive, from precision agriculture system 250, the information that identifies the emergence value, and may provide the information for display (e.g., may cause the information to be displayed via a user interface associated with a PAS application).

In some implementations, user device 210 may provide, for display, information that identifies the emergence area. For example, user device 210 may provide, for display, imagery data associated with the emergence area, and/or multiple emergence areas. Additionally, or alternatively, user device 210 may provide, for display, a graphical representation (e.g., a heat map) that identifies multiple emergence areas. For example, user device 210 may provide, for display, an overlay (e.g., a color, such as green, yellow, orange, or red) based on particular emergence values associated with emergence areas. In some implementations, the overlay may be associated with a particular dimension of the emergence area. For example, the overlay may correspond to a particular dimension value (e.g., 2.5 square meters). In this way, a user may identify particular areas (e.g., of a farm, field, zone, etc.) that may be associated with emergence issues.

In some implementations, user device 210 may provide, for display, information that identifies the actual commodities associated with an emergence area. For example, user device 210 may provide, for display, indicators (e.g., icons) that identify each actual commodity associated with an emergence area. Additionally, or alternatively, user device 210 may provide, for display, information that identifies locations of each actual commodity. Additionally, or alternatively, user device 210 may provide, for display, information that identifies a planting date associated with the emergence area. In some implementations, user device 210 may receive an input (e.g., a touch gesture, a key input, or a mouse input), and may update a display of information (e.g., may perform a zoom operation, a scroll operation, may update particular information, or the like).

In this way, a user may assess the health of a particular emergence area based on the information provided for display. For example, the user may determine an action to be taken based on the emergence value associated with an emergence area. In some implementations, precision agriculture system 250 may permit and/or cause an action to be automatically performed based on the emergence value, in a similar manner as described in connection with FIG. 8.

In this way, implementations described herein may enable precision agriculture system 250 to identify particular emergence areas that may require a farming operation to be performed (e.g., a replanting), and may provide information that identifies the particular emergence areas. In this way, computing resources of user devices 210 may be conserved by reducing a need of a user to attempt to identify such emergence issues using user devices 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5F are diagrams of an example implementation 500 relating to example process 400 shown in FIG. 4. FIGS. 5A-5F show an example of determining an emergence value associated with a commodity.

Figure 5A:
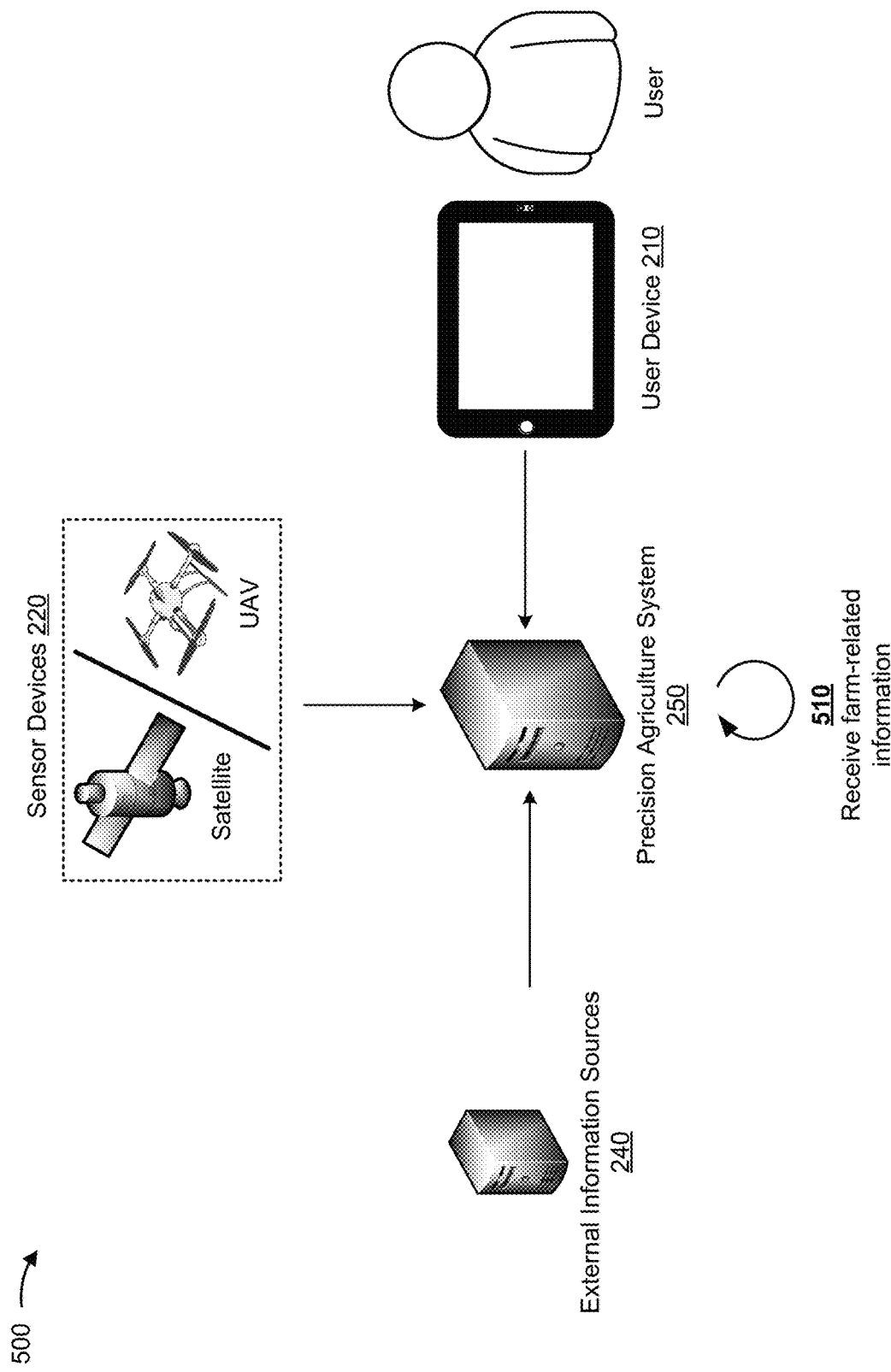
FIGS. 5A-5F are diagrams of an example implementation relating to the example process shown in FIG. 4.

As shown in FIG. 5A, and by reference number 510, precision agriculture system 250 may receive farm-related information from multiple sources, such as user device 210, sensor devices 220 (e.g., associated with a UAV, a satellite, or the like), and/or external information sources 240. For example, precision agriculture system 250 may receive imagery data, a line interval value, a seed interval value, information that identifies a size of an emergence area, or the like.

Figure 5B:
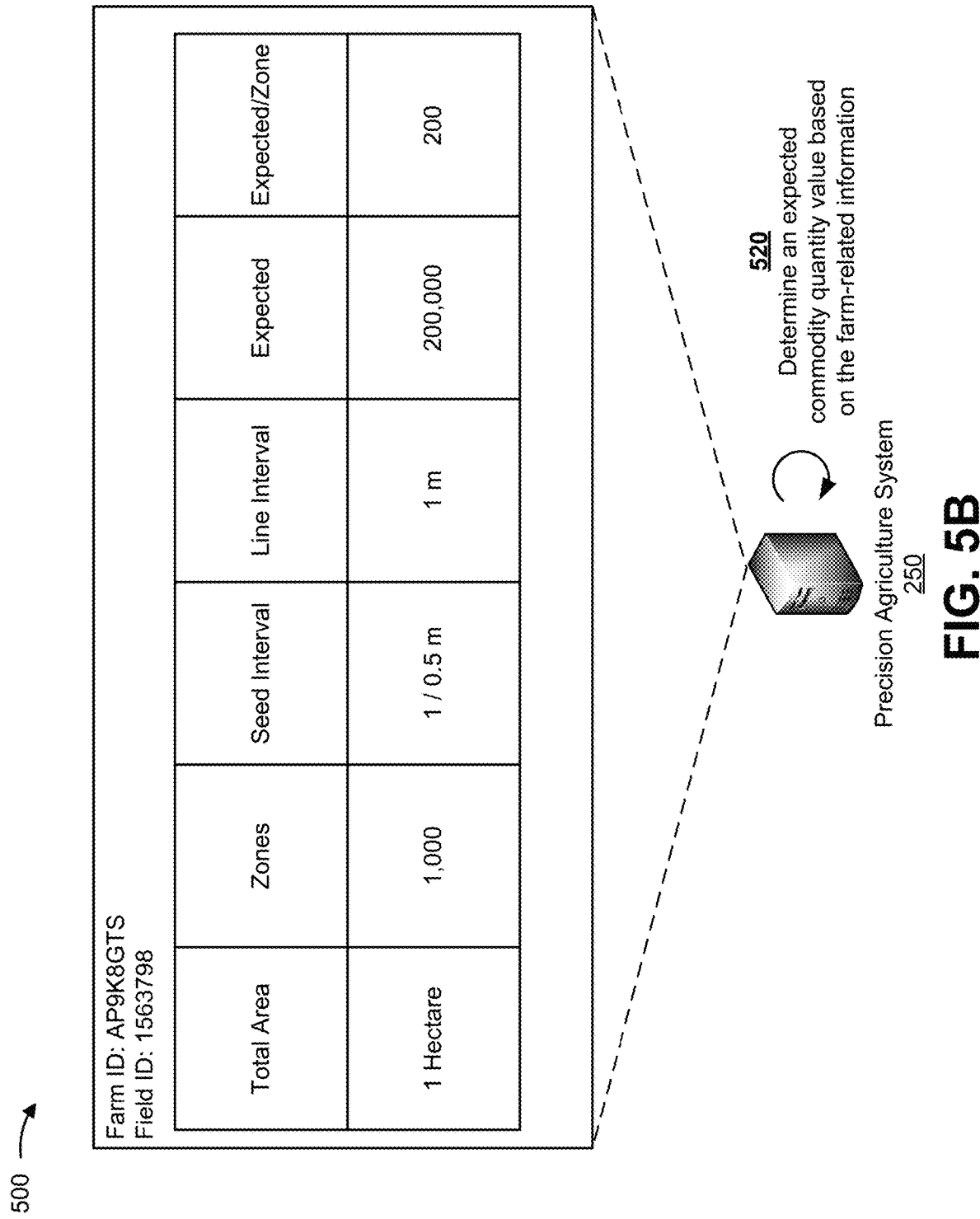

As shown in FIG. 5B, and by reference number 520, precision agriculture system 250 may determine an expected commodity quantity value based on the farm-related information. As shown, precision agriculture system 250 may determine an expected commodity quantity value per emergence area (e.g., per a field, per a zone, etc.) based on the seed interval value (e.g., one seed per half meter), and a line interval value (e.g., one meter).

Figure 5C:

As shown in FIG. 5C, and by reference number 530, precision agriculture system 250 may determine an actual commodity quantity value based on the farm-related information. For example, precision agriculture system 250 may identify commodities based on imagery data associated with the emergence area. As described in more detail in connection with FIG. 6, precision agriculture system 250 may identify a commodity based on one or more image processing techniques and/or based on analyzing pixel values associated with the imagery data.

Figure 5D:
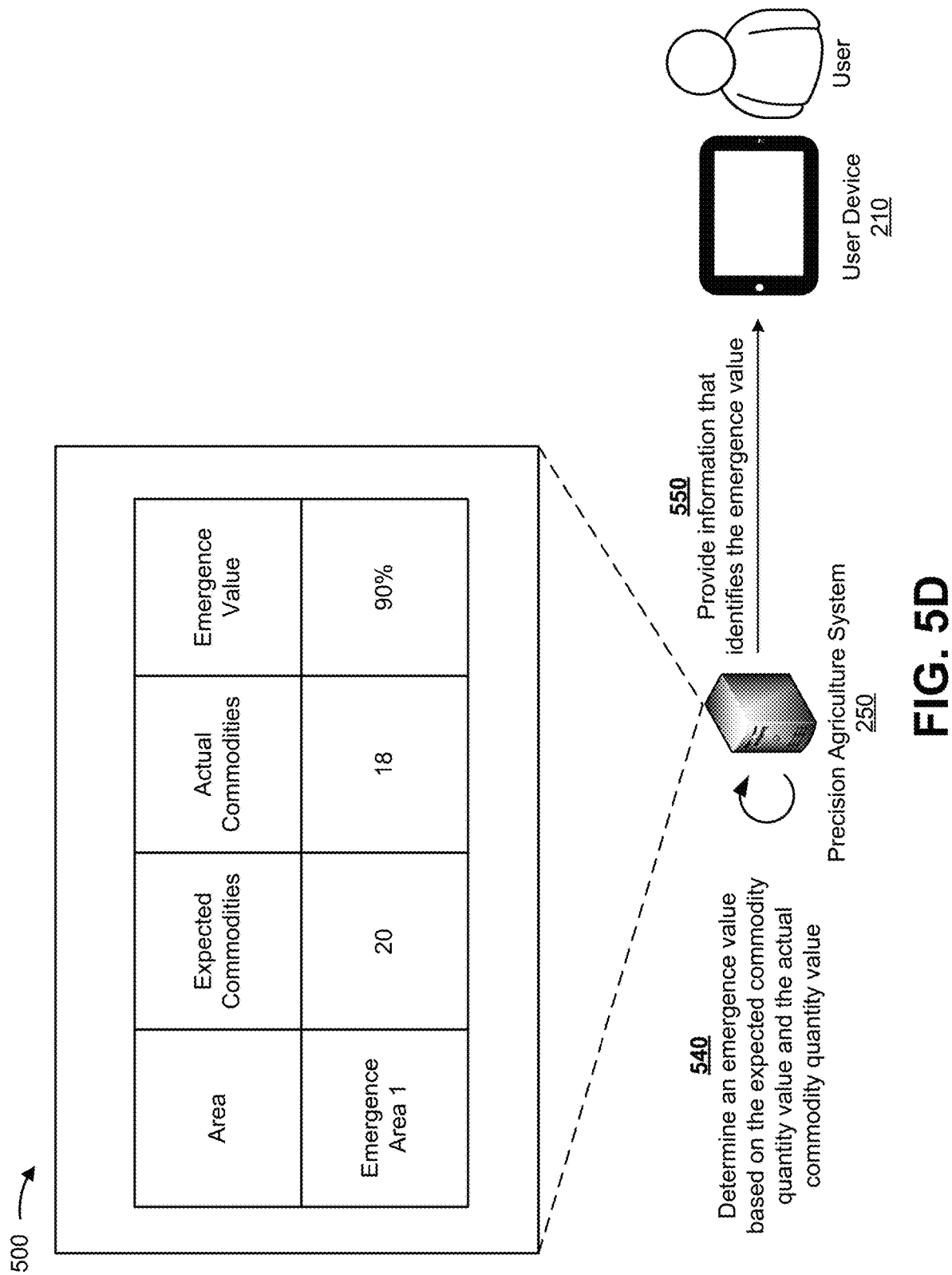

As shown in FIG. 5D, and by reference number 540, precision agriculture system 250 may determine an emergence value based on the expected commodity quantity value and the actual commodity quantity value. For example, as shown, assume that precision agriculture system 250 compares an actual commodity quantity value (e.g., 18) and an expected commodity quantity value (e.g., 20), and determines an emergence value (e.g., 90%). As shown by reference number 550, precision agriculture system 250 may provide, to user device 210, information that identifies the emergence value.

Figure 5E:
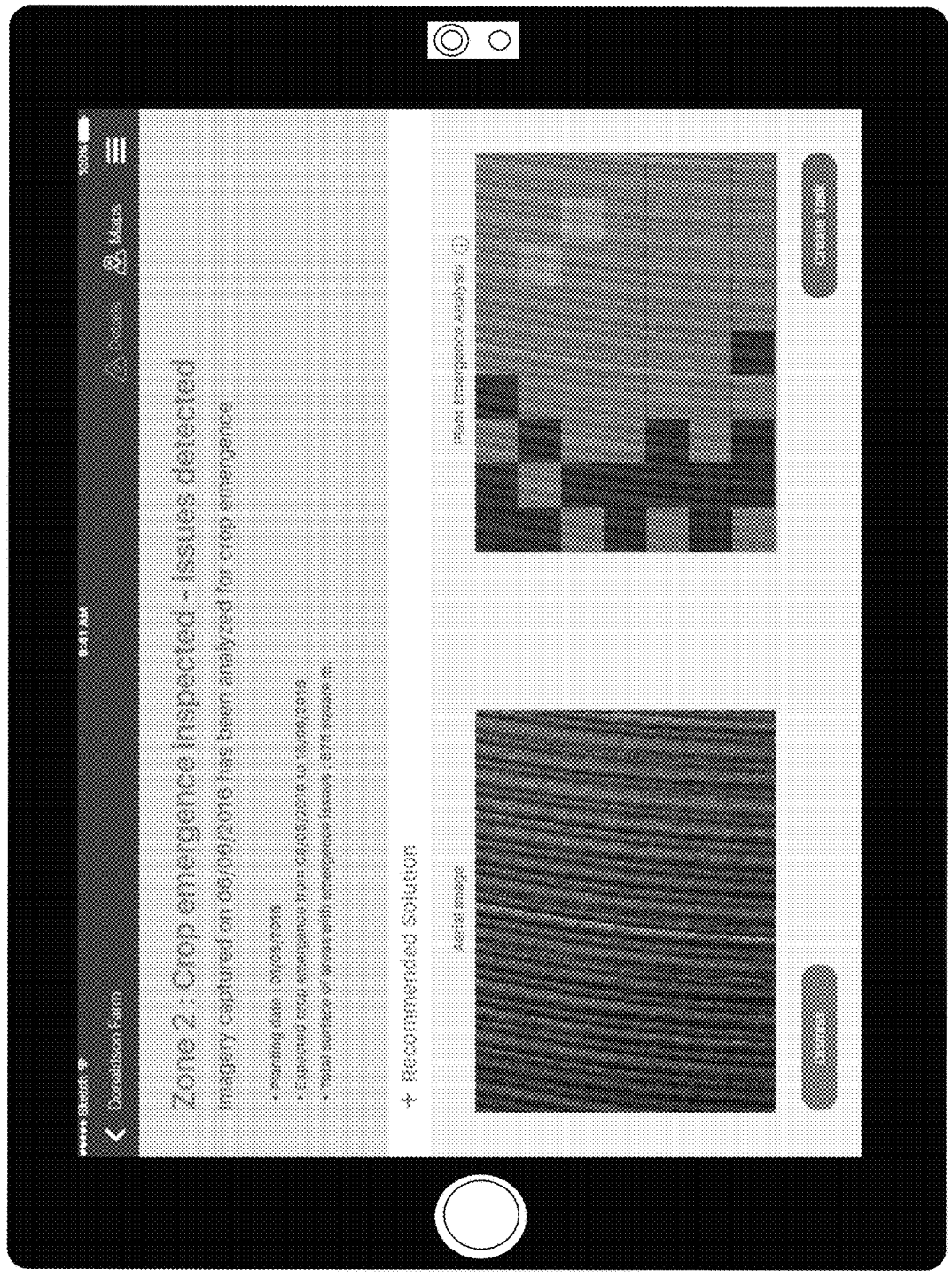

As shown in FIG. 5E, user device 210 may provide information for display (e.g., via a user interface) based on the emergence value. As shown, user device 210 may provide, for display, imagery data (e.g., an aerial image) associated with a particular area, and may provide, for display, information associated with multiple emergence areas associated with the particular area. For example, assume that precision agriculture system 250 determines emergence values for multiple emergence areas associated with the particular area. In this case, and as shown, user device 210 may provide, for display, a heat map based on the emergence values. For example, user device 210 may overlay the aerial image with various colors based on emergence values associated with underlying emergence areas. As an example, and as shown, user device 210 may provide, for display, a green overlay in association with emergence areas that include emergence values that satisfy a threshold (e.g., 80% emergence). Further, user device 210 may provide, for display, a red overlay in association with emergence areas that include emergence values that do not satisfy a threshold (e.g., are associated with emergence issues). Additionally, as shown, user device 210 may provide, for display, information that identifies a total surface area of emergence areas associated with emergence issues.

Figure 5F:
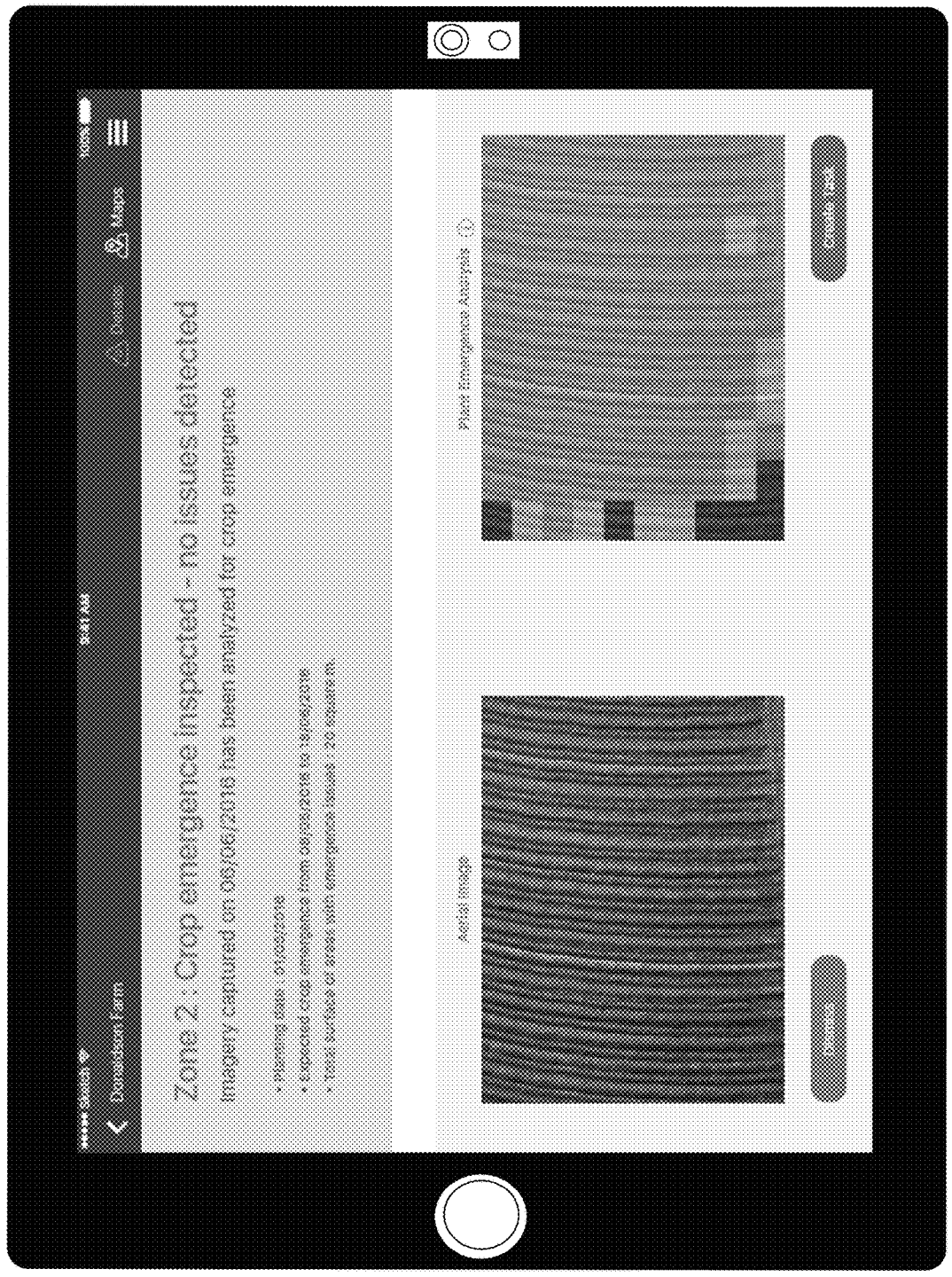

As shown in FIG. 5F, and as another example, user device 210 may provide, for display, a heat map of a particular area that is not associated with particular emergence issues. For example, as shown, assume that precision agriculture system 250 determines that a total surface area of emergence areas that are associated with emergence issues does not satisfy a threshold. In this case, and as shown, user device 210 may provide, for display, an indication that issues do not exist in association with the particular area.

As indicated above, FIGS. 5A-5F are provided merely as an example. Other examples are possible and may differ from what was described with regard to FIGS. 5A-5F.

Figure 6:
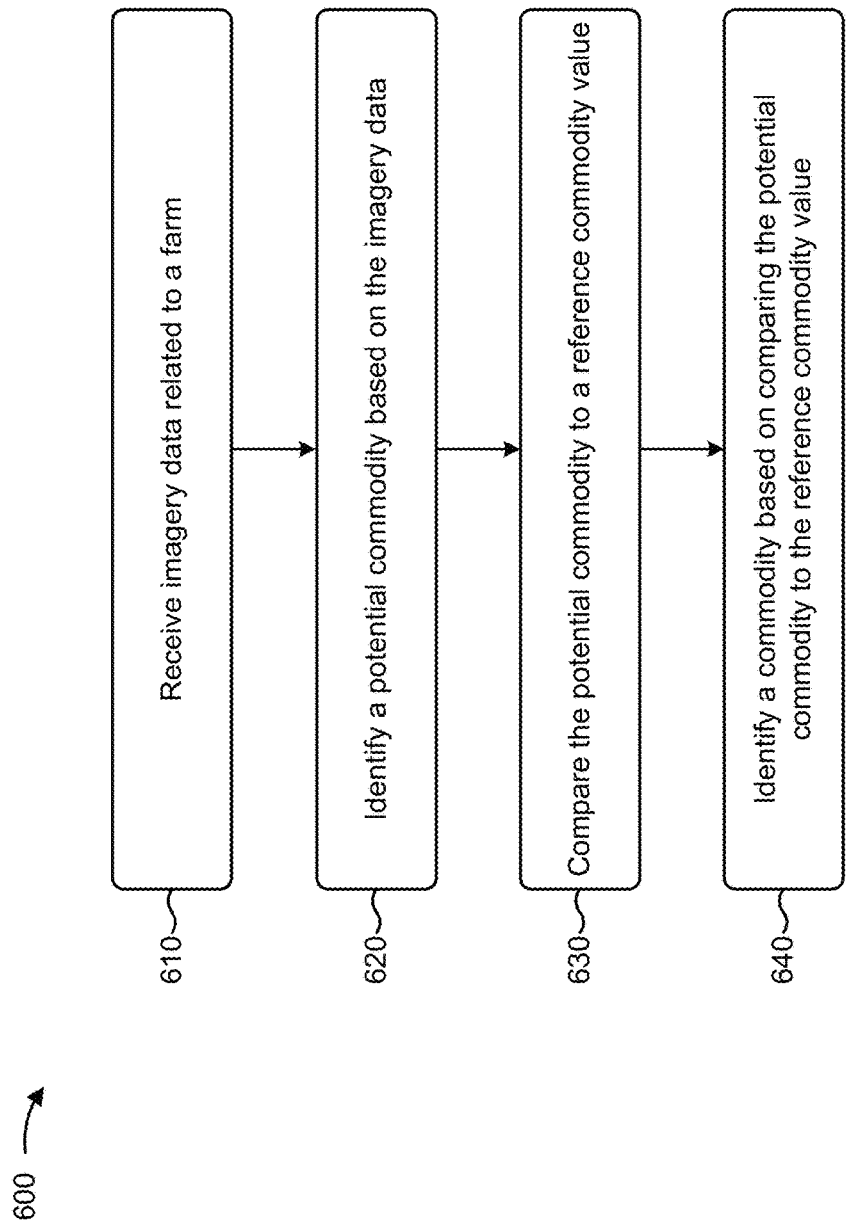
FIG. 6 is a flow chart of an example process for performing an image processing technique to identify a commodity.

FIG. 6 is a flow chart of an example process 600 for performing an image processing technique to identify a commodity. In some implementations, one or more process blocks of FIG. 6 may be performed by precision agriculture system 250. In some implementations, one or more process blocks of FIG. 6 may be performed by another device or a group of devices separate from or including precision agriculture system 250, such as user device 210, sensor device 220, application database 230, external information source 240, and/or farming device 260.

As shown in FIG. 6, process 600 may include receiving imagery data related to a farm (block 610). For example, precision agriculture system 250 may receive information associated with an image related to a farm (e.g., an image, a set of images, or the like). In some implementations, the imagery data may include imagery data as described above in connection with FIG. 4. In some implementations, precision agriculture system 250 may receive the imagery data from sensor device 220, application database 230, external information source 240, and/or another device. In some implementations, precision agriculture system 250 may receive the imagery data, and/or may perform image processing techniques to identify commodities based on a request (e.g., from user device 210). Additionally, or alternatively, precision agriculture system 250 may perform image processing to identify commodities based on an event, a time frame, or the like (e.g., based on a planting date value, or the like).

In some implementations, the imagery data may be associated with a ground sample distance (GSD) value, as described above in connection with FIG. 4. As an example, assume that the imagery data includes images captured by sensor device 220 associated with a UAV. In this case, the GSD value may be calculated based on parameters, such as a sensor width of sensor device 220, an altitude of the UAV, a focal length of sensor device 220, and a maximum of the width or height of the image (e.g., pixel quantity). In some implementations, precision agriculture system 250 may receive information that identifies a GSD value associated with the imagery data. Alternatively, precision agriculture system 250 may receive information that identifies the parameters, and may determine the GSD value based on the received parameters.

In some implementations, the imagery data may be associated with a temporal indicator (e.g., a timestamp). In some implementations, precision agriculture system 250 may discard the imagery data based on a temporal indicator and/or a GSD value (e.g., not perform image processing). For example, precision agriculture system 250 may determine whether the imagery data is associated with a temporal indicator that is within a particular time frame (e.g., based on a planting date value, based on an expected emergence date value, based on an expected emergence end date value, or the like).

Additionally, or alternatively, precision agriculture system 250 may discard imagery data associated with a GSD value that satisfies a threshold. For example, precision agriculture system 250 may identify a GSD value associated with the imagery data, and may determine whether the GSD value satisfies a threshold. In some implementations, precision agriculture system 250 may determine the threshold based on a commodity size threshold value (e.g., a physical measurement of the commodity, such as a height, width, diameter, etc.). As an example, assume that a commodity (e.g., leaves associated with a cotton crop), at a time of capture of the imagery data, measures 7-10 centimeters in diameter. In this case, precision agriculture system 250 may determine to discard imagery data that includes a GSD value greater than 3.5 centimeters per pixel (e.g., because precision agriculture system 250 may inaccurately identify commodities, and/or may fail to identify commodities with such a GSD value).

Additionally, or alternatively, precision agriculture system 250 may downsize the imagery data (e.g., decrease a resolution) based on the GSD value (e.g., may downsize an image resolution while maintaining that the GSD value does not satisfy the threshold). In this way, precision agriculture system 250 may determine whether processing of the imagery data may provide accurate results (e.g., may accurately identify commodities), and may conserve processor and/or memory resources by not processing imagery data that may provide inaccurate results. Additionally, precision agriculture system 250 may conserve processor and/or memory resources by reducing an image resolution (e.g., requiring fewer resources to be consumed during image processing and/or storing).

In some implementations, precision agriculture system 250 may perform one or more image preprocessing techniques. For example, precision agriculture system 250 may perform an orthorectification technique. In some implementations, precision agriculture system 250 may receive an image, and perform an orthorectification technique to remove the effects of topographical variations in the surface of the earth (e.g., the field, zone, etc.) and the tilt of sensor device 220 (e.g., associated with the UAV, satellite, etc.). Additionally, precision agriculture system 250 may perform the orthorectification technique, such that each pixel, in the orthorectified image, includes the same GSD value. In this way, each pixel may be eligible to be associated with a coordinate value or values, as described below, thereby enabling relative distances between features to be identified (e.g., commodities, etc.).

In some implementations, precision agriculture system 250 may perform a stitching technique using multiple orthorectified images, and may generate a single image. For example, precision agriculture system 250 may receive multiple orthorectified images (e.g., overlapping images, etc.) of an emergence area, and may perform a stitching technique to generate a single image of the emergence area. As an example, precision agriculture system 250 may implement a stitching technique to relate pixel coordinates in a first orthorectified image and pixel coordinates in a second orthorectified image (e.g., may perform an alignment technique), and/or may map particular features in a first orthorectified image and corresponding features in a second orthorectified image. In some implementations, precision agriculture system 250 may generate a single image of the emergence area, and may perform a georeferencing technique based on the image of the emergence area, as described below.

In some implementations, precision agriculture system 250 may perform a georeferencing technique based on the image of the emergence area. For example, precision agriculture system 250 may associate locations (e.g., pixel locations) associated with the image of the emergence area, with coordinate values (e.g., longitude and latitude coordinates) of geographic locations of the emergence area (e.g., associated with the farm, field, zone, etc.). In some implementations, precision agriculture system 250 may perform the georeferencing technique using georeferenced image data (e.g., satellite images of an emergence area, or the like). For example, precision agriculture system 250 may receive georeferenced imagery data (e.g., geographic tagged image file format (GeoTIFF) files), and may georeference the image of the emergence area using the georeferenced imagery data. In this way, precision agriculture system 250 may generate a georeferenced image of an emergence area, that may be used to identify commodities, as described below.

In some implementations, precision agriculture system 250 may perform an image filtering technique to remove information associated with the image (e.g., the georeferenced image of the emergence area). In some implementations, precision agriculture system 250 may perform a spectral band filtering technique. For example, precision agriculture system 250 may remove information associated with one or more spectral bands (e.g., may remove noise associated with one or more spectral bands). As an example, sensor device 220 (e.g., associated with the UAV) may capture imagery data on multiple spectral bands (e.g., an RGB spectrum, an NIR spectrum, an IR spectrum, or the like). Additionally, the imagery data may include pixel values for each spectral band (e.g., a measured physical quantity, such as a solar radiance in a particular wavelength band, emitted IR radiation, or the like).

In some implementations, precision agriculture system 250 may perform a filtering technique and may remove information associated with particular spectral bands (e.g., an NIR spectral band, an IR spectral band, or the like). Additionally, or alternatively, precision agriculture system 250 may perform a filtering technique, such that the imagery data includes information (e.g., pixel values) associated with a particular spectral band (e.g., the RGB spectral band). In this way, precision agriculture system 250 may remove unnecessary information, thereby conserving processor and/or memory resources when performing the commodity identification process.

As further shown in FIG. 6, process 600 may include identifying a potential commodity based on the imagery data (block 620). For example, precision agriculture system 250 may identify a potential commodity based on pixel values (e.g., pixel intensity values, RGB values, NDVI values, or the like) of the georeferenced image of the emergence area. In some implementations, a potential commodity may refer to a set of pixels that may correspond to a commodity (e.g., a physical commodity associated with the emergence area). As an example, a set of pixels in the image of the emergence area may correspond to an actual commodity.

In some implementations, precision agriculture system 250 may generate a grid using the georeferenced image of the emergence area. For example, precision agriculture system 250 may generate a grid, such that the georeferenced image of the reference area includes a two dimensional array of pixels arranged in columns and rows. Additionally, or alternatively, precision agriculture system 250 may divide the grid into sub-arrays (e.g., cells), such that each sub-array includes a quantity of columns and rows that is less than the quantity of columns and rows associated with the grid. In this way, precision agriculture system 250 may identify commodities per cell, and may generate an emergence value per cell, as described elsewhere herein.

In some implementations, precision agriculture system 250 may identify a potential commodity based on pixel values (e.g., based on performing a thresholding technique, an edge detection technique, or the like). For example, each pixel associated with the image may include respective RGB values (e.g., RGB triplet values). In some implementations, precision agriculture system 250 may identify a potential commodity based on identifying a pixel that includes a particular value that satisfies a threshold (e.g., an integer value that satisfies a threshold). For example, precision agriculture system 250 may identify a pixel that includes a green value that satisfies a threshold. Additionally, or alternatively, precision agriculture system 250 may identify a potential commodity based on identifying a quantity of pixels that satisfies a threshold (e.g., a set of contiguous pixels that include pixel values that satisfy a threshold). For example, precision agriculture system 250 may identify a set of contiguous pixels, and may identify a height and/or width of the set of contiguous pixels (e.g., a height and/or width of an array of the set of contiguous pixels).

In some implementations, precision agriculture system 250 may identify a non-emerged commodity based on pixel values. For example, a non-emerged commodity may refer to a commodity that was expected to emerge and did not emerge. In some implementations, precision agriculture system 250 may identify a non-emerged commodity based on line spacing values and seed interval values. For example, precision agriculture system 250 may identify particular locations of an emergence area at which commodities are expected to emerge (e.g., based on line spacing values and seed spacing values), and identify pixel values associated with the particular locations. Additionally, precision agriculture system 250 may determine that commodities did not emerge in association with the particular locations based on the pixel values.

In some implementations, precision agriculture system 250 may encapsulate the set of contiguous pixels (e.g., using an encapsulation matrix). For example, precision agriculture system 250 may determine an encapsulation matrix of pixels (e.g., a matrix of m rows and n columns) that encapsulates the set of contiguous pixels, such that each pixel of the set of contiguous pixels is contained within the encapsulation matrix. Additionally, or alternatively, precision agriculture system 250 may identify a center pixel, of the set of contiguous pixels, and may determine an encapsulation matrix based on the center pixel. For example, precision agriculture system 250 may determine an encapsulation matrix where the center pixel, of the set of contiguous pixels, is the center pixel of the encapsulation matrix. In this way, precision agriculture system 250 may compare a size of the encapsulation matrix and a size of a reference commodity value, and may identify a commodity, as described below.

As further shown in FIG. 6, process 600 may include comparing the potential commodity to a reference commodity value (block 630). For example, precision agriculture system 250 may compare a size of the encapsulation matrix (e.g., a quantity of pixels) and a size of a reference commodity value. In some implementations, a reference commodity value may refer to a value (e.g., a quantity of pixels, a quantity of contiguous pixels, a quantity of rows of pixels, a quantity of columns of pixels, a size of a matrix of pixels, or the like) that may be used to determine whether a potential commodity is an actual commodity. As an example, assume that the commodity (e.g., a cotton crop) includes an expected physical diameter of seven to ten centimeters at the time that the imagery data was captured. Additionally, assume that a GSD value, associated with the image of the emergence area, includes two centimeters per pixel. In this case, the reference commodity value may include a matrix size of three pixels by three pixels (e.g., indicating a square of six square centimeters in physical size). In some implementations, precision agriculture system 250 may compare the reference commodity value and the size of the encapsulation matrix. Additionally, or alternatively, precision agriculture system 250 may compare a quantity of pixels, associated with the set of contiguous pixels, and the reference commodity value, or the like. In this way, precision agriculture system 250 may identify a commodity, as described below.

As further shown in FIG. 6, process 600 may include identifying a commodity based on comparing the potential commodity to the reference commodity value (block 640). For example, precision agriculture system 250 may identify a commodity based on comparing a size of the encapsulation matrix and the reference commodity value. In some implementations, precision agriculture system 250 may determine that a size of the encapsulation matrix satisfies the reference commodity value, and may identify a commodity based on the size of the encapsulation matrix satisfying the reference commodity value.

In some implementations, precision agriculture system 250 may identify a commodity based on the potential commodity and a GSD value. For example, assume that the potential commodity includes a set of contiguous pixels measuring three pixels by four pixels, and that the GSD value is two centimeters per pixel. In this case, precision agriculture system 250 may estimate a physical size, of the commodity, based on the set of contiguous pixels and the GSD value (e.g., may estimate that the commodity includes a diameter between six and eight centimeters, for example). Further, precision agriculture system 250 may identify the commodity based on the estimated physical size. For example, assume that the expected size of the commodity is between six and ten centimeters. In this case, precision agriculture system 250 may identify the commodity based on the estimated physical size (e.g., because the estimated physical size corresponds to the expected physical size).

In some implementations, precision agriculture system 250 may identify the commodity based on a line interval value and/or a seed interval value. For example, precision agriculture system 250 may identify planting locations (e.g., associated with lines and/or associated with the seed interval per line) based on the georeferenced image (e.g., based on geographical coordinates), and may identify potential commodities based on the planting locations (e.g., locations where a commodity may be expected to emerge). Additionally, or alternatively, precision agriculture system 250 may identify a commodity based on identifying a potential commodity in association with a planting location. In this way, precision agriculture system 250 may more accurately identify commodities based on geographical coordinates.

In some implementations, precision agriculture system 250 may identify a non-emerged commodity based on a line interval value and/or a seed interval value. For example, precision agriculture system 250 may identify planting locations at which commodities are expected to emerge yet did not emerge. In some implementations, precision agriculture system 250 may determine a non-emergence value based on a quantity of non-emerged commodities. In some implementations, precision agriculture system 250 may determine an emergence value and/or an emergence issue based on a non-emergence value.

In some implementations, precision agriculture system 250 may identify a quantity of commodities per cell, as described above. For example, precision agriculture system 250 may identify a quantity of commodities associated with each cell of the grid, and may store information identifying geographical coordinates of each commodity. In some implementations, precision agriculture system 250 may identify a quantity of commodities per cell based on a quantity of encapsulation matrices associated with each cell. Additionally, or alternatively, precision agriculture system 250 may identify a quantity of commodities that did not emerge associated with each cell of the grid.

In this way, precision agriculture system 250 may determine an emergence value, per cell, based on the actual commodities, as described above in connection with FIG. 4. Additionally, or alternatively, precision agriculture system 250 may provide information, to user device 210, that identifies the actual commodities (e.g., a quantity of commodities, locations of the commodities, or the like), as described above in connection with FIG. 4.

In some implementations, precision agriculture system 250 may generate a model (e.g., using a machine learning technique) to identify commodities in association with a particular emergence area. For example, precision agriculture system 250 may receive information that identifies whether an actual commodity (e.g., as identified by precision agriculture system 250) corresponds to an actual commodity (e.g., as confirmed by a user), and may identify additional commodities based on the received information. For example, precision agriculture system 250 may receive additional imagery data associated with the emergence area, and may identify commodities using the model (e.g., may implement a machine perception technique, a computer vision technique, or the like). In some implementations, precision agriculture system 250 may create a model using information associated with a first farm, and may use the model to identify commodities in association with a second farm.

In some implementations, an emergence area may correspond to a grid, a cell of a grid, or the like. In this way, precision agriculture system 250 may determine emergence values for a field, a zone, a subset area of a zone, or the like. Additionally, in this way, precision agriculture system 250 may determine emergence values that correspond to areas of varying dimensions, which may enable user device 210 to provide, for display, information associated with the emergence values in a way that improves readability (e.g., in the form of a heat map). As an example, user device 210 may provide information for display that identifies an emergence area of two and a half square meters. In this way, a user may more accurately identify a particular location of an emergence area (e.g., that as compared to an emergence area including another dimension).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
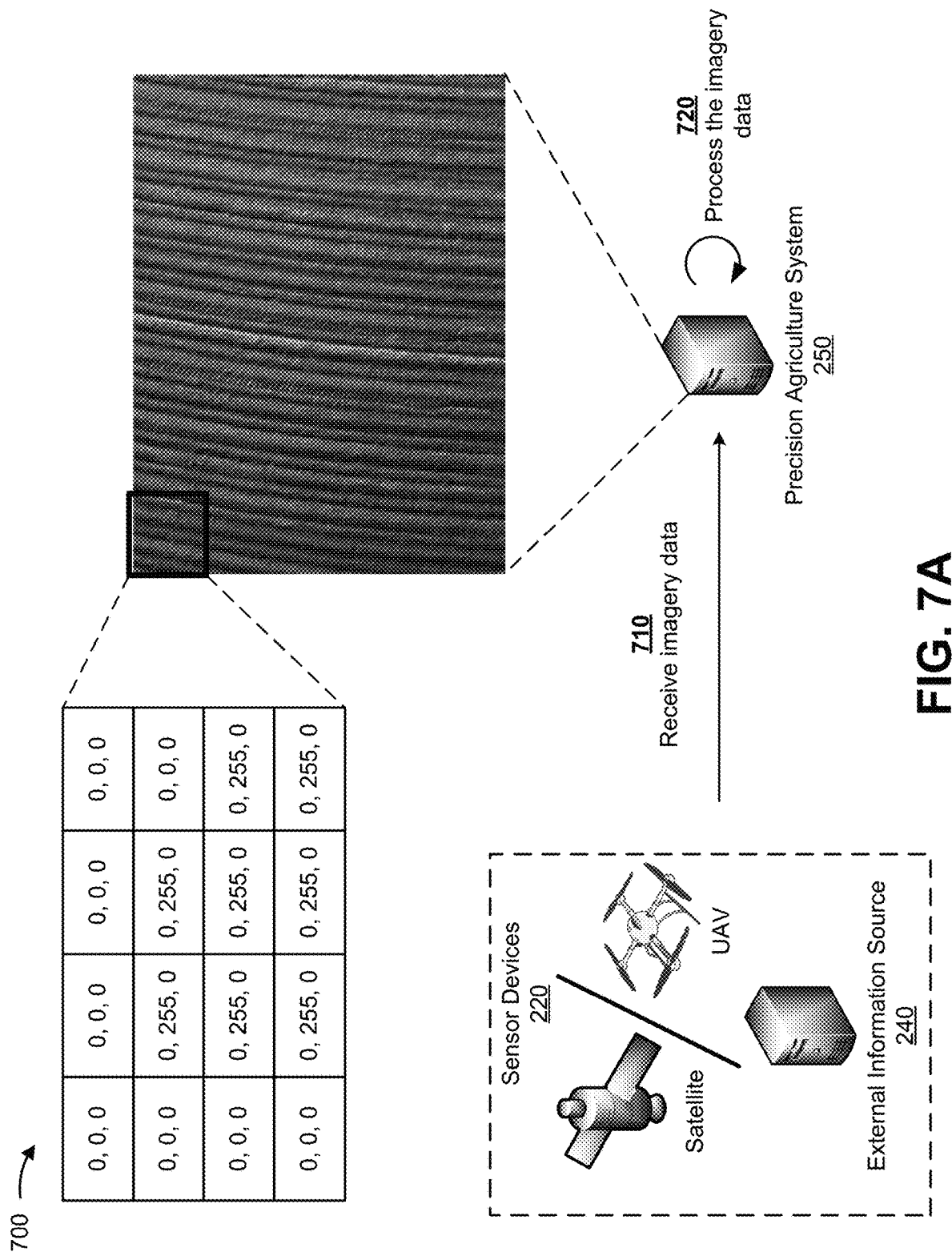
FIGS. 7A-7C are diagrams of an example implementation relating to the example process shown in FIG. 6.
Figure 7B:
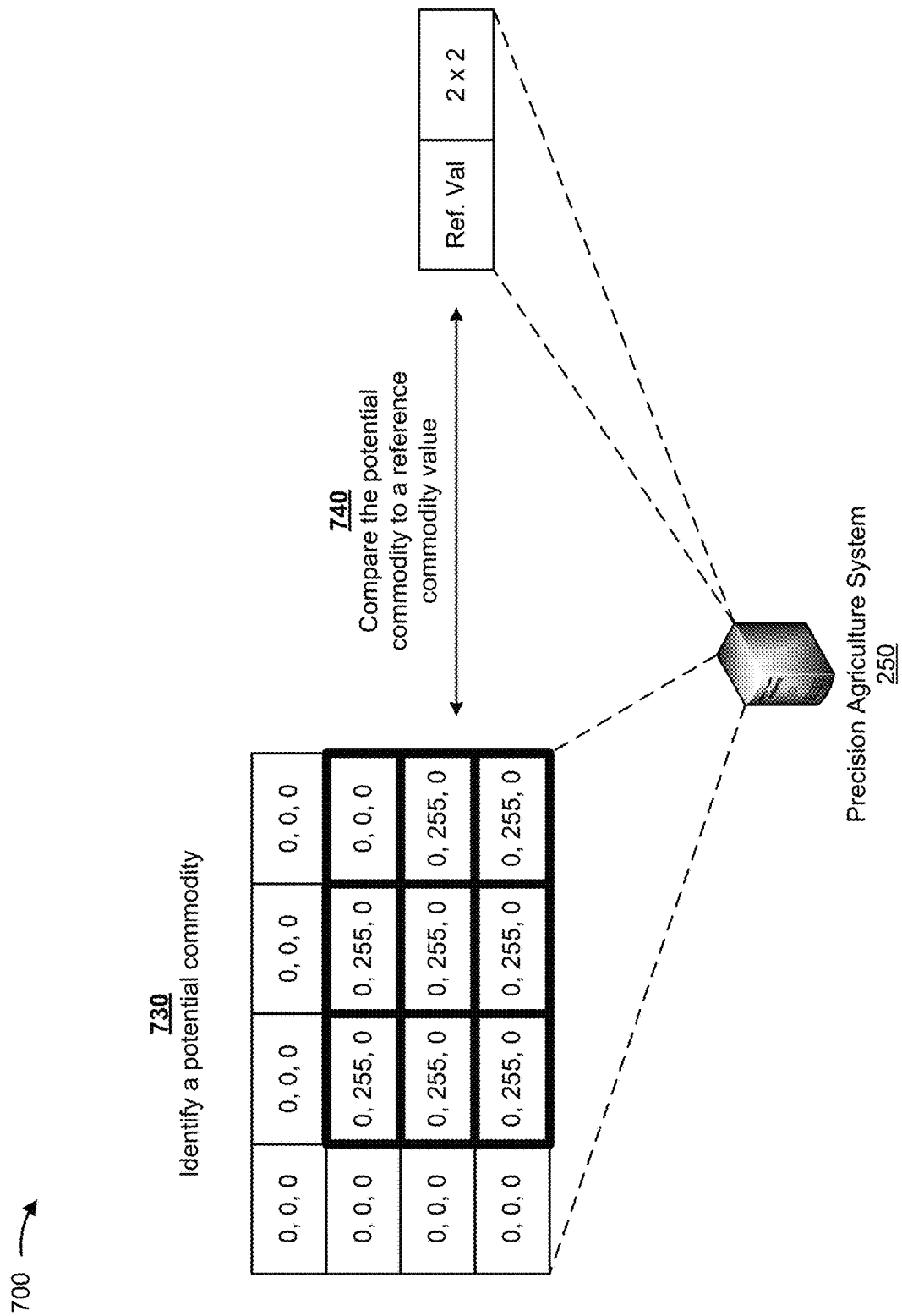
Figure 7C:
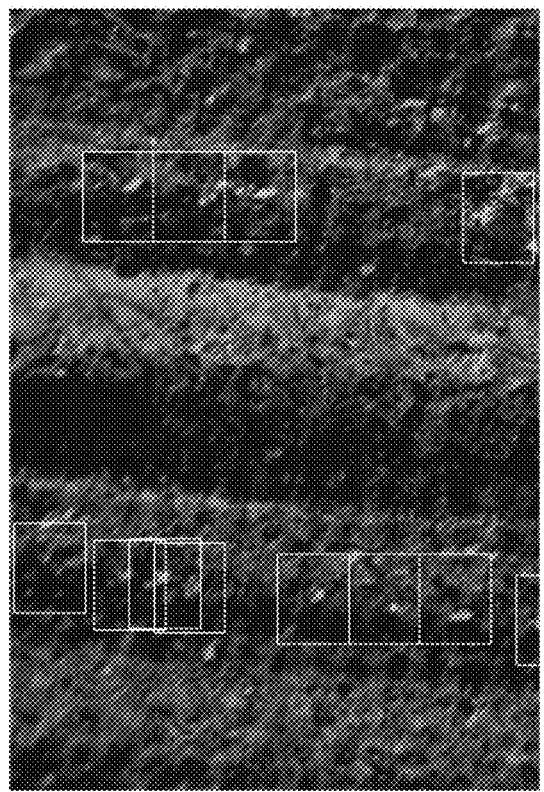

FIGS. 7A-7C are diagrams of an example implementation 700 relating to example process 600 shown in FIG. 6. FIGS. 7A-7C show an example of performing an image processing technique to identify a commodity.

As shown in FIG. 7A, precision agriculture system 250 may receive imagery data related to a farm. For example, as shown by reference number 710, precision agriculture system 250 may receive, from sensor devices 220 (e.g., associated with imagery devices, such as a UAV and/or a satellite) and/or external information source 240, imagery data associated with a farm. As shown by reference number 720, precision agriculture system 250 may process the imagery data (e.g., may perform one or more preprocessing techniques, such as orthorectification, stitching, georeferencing, filtering, or the like). In other implementations, precision agriculture system 250 may receive imagery data that has already been preprocessed. As shown, the imagery data may include pixels arranged in a grid format. Each pixel, of the grid, may include an array of RGB values (e.g., integer values ranging from zero to two hundred and fifty five, or the like).

As shown in FIG. 7B, and by reference number 730, precision agriculture system 250 may identify a potential commodity. For example, as shown, precision agriculture system 250 may identify particular pixels that are associated with a green value that satisfies a threshold. For example, precision agriculture system 250 may identify a set of contiguous pixels (e.g., eight pixels) that include green values that satisfy a threshold (e.g., a potential commodity). Additionally, as shown, precision agriculture system 250 may determine an encapsulation matrix (e.g., a three by three matrix) that encapsulates each pixel of the set of contiguous pixels.

As shown by reference number 740, precision agriculture system 250 may compare the potential commodity and a reference commodity value. For example, as shown, the reference commodity value may include a two by two matrix value. As an example, assume that the GSD value of the image is three centimeters per pixel.

As show in FIG. 7C, and by reference number 750, precision agriculture system 250 may identify a commodity based on comparing the potential commodity and the reference commodity value. For example, precision agriculture system 250 may determine that the encapsulation matrix satisfies the reference commodity value (e.g., is greater than the reference commodity value). As an example, the reference commodity value may indicate that potential commodities, having estimated physical sizes greater than (or greater than or equal to) four square centimeters, are commodities (e.g., based on the GSD value). In this case, precision agriculture system 250 may estimate that the potential commodity has a physical size of six square centimeters, and may thus identify a commodity based on the estimated physical size.

As shown, precision agriculture system 250 may generate an image that identifies the actual commodities for a particular emergence area, that identifies encapsulation matrices, or the like. As an example, precision agriculture system 250 may use the generated image to determine an emergence value, and/or may provide information that identifies the image (e.g., to user device 210).

As indicated above, FIGS. 7A-7C are provided merely as an example. Other examples are possible and may differ from what was described with regard to FIGS. 7A-7C.

Figure 8:
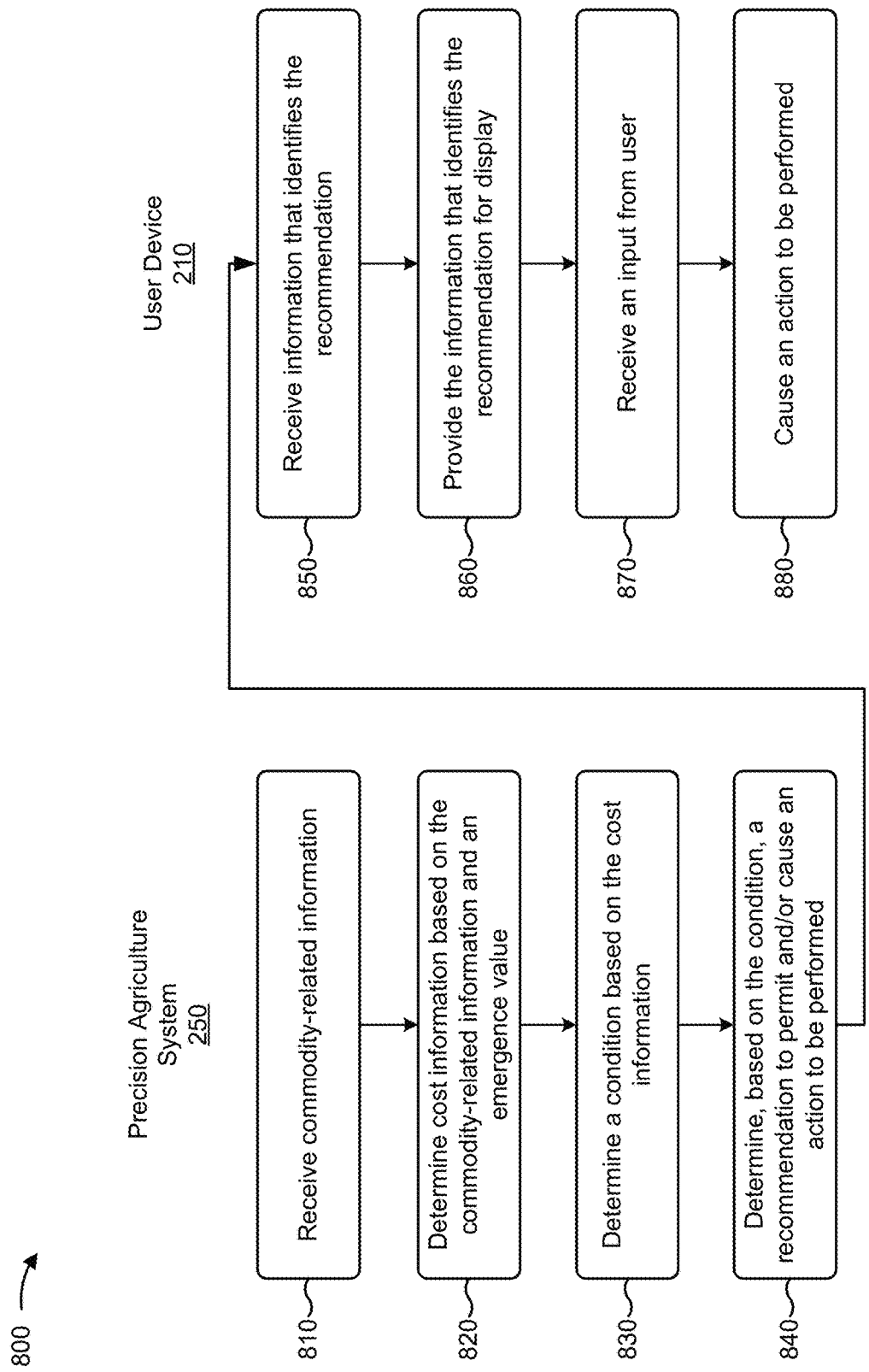
FIG. 8 is a flow chart of an example process for determining a recommendation based on an emergence value of a commodity and permitting and/or causing an action to be performed based on the recommendation.

FIG. 8 is a flow chart of an example process 800 for determining a recommendation based on an emergence value of a commodity and permitting and/or causing an action to be performed based on the recommendation. In some implementations, one or more process blocks of FIG. 8 may be performed by precision agriculture system 250 and/or user device 210. In some implementations, one or more process blocks of FIG. 8 may be performed by another device or a group of devices separate from or including precision agriculture system 250 and/or user device 210, such as sensor device 220, application database 230, external information source 240, and/or farming device 260.

As shown in FIG. 8, process 800 may include receiving commodity-related information (block 810). For example, precision agriculture system 250 may receive commodity-related information. In some implementations, commodity-related information may include information associated with a commodity that may enable precision agriculture system 250 to identify a recommendation and/or an action to be performed based on the recommendation, as described elsewhere herein.

In some implementations, the commodity-related information may include a replanting cost value. A replanting cost value may include a monetary value associated with replanting a particular emergence area. For example, a replanting cost value may include a value that reflects a monetary value associated with materials (e.g., seeds, chemicals, water, fuel, etc.), associated with workers (e.g., a salary, an hourly rate, etc.), associated with operating costs (e.g., associated with farming devices 260, such as maintenance costs, fuel consumption costs, etc.), associated with labor time (e.g., a quantity of man hours needed, a quantity of hours of use of a particular farming device 260, etc.), or the like. In some implementations, the commodity-related information may include a commodity value (e.g., a current market price, an average market price, a maximum market price, or the like, associated with the commodity).

In some implementations, the commodity-related information may include an assumed loss factor. An assumed loss factor may include a value (e.g., a quantity, a percentage, or the like) associated with an assumed loss (e.g., planted seeds that may not emerge, may not be harvested, may not produce a yield, etc.). In some implementations, the commodity-related information may include a replanting factor, such as a quantity of re-plantings that may be necessary to produce a particular yield. In some implementations, the commodity-related information may include a commodity yield value (e.g., a predicted commodity yield, a historical commodity yield, an average commodity yield, or the like). A commodity yield value may include, for example, a measurement of a particular commodity that may be harvested per emergence area (e.g., kilograms of commodity per hectare).

In some implementations, precision agriculture system 250 may receive the commodity-related information from user device 210, sensor devices 220, application database 230, external information sources 240, and/or farming device 260. In some implementations, precision agriculture system 250 may receive the commodity-related information at a particular time interval, passively, in real time, or the like. In some implementations, precision agriculture system 250 may request the commodity-related information, and may receive the commodity-related information based on the request. In some implementations, precision agriculture system 250 may receive and/or determine the commodity-related information based on performing a technique, such as a machine learning technique (e.g., using one or more models), a data mining technique, a web crawling technique, a web scraping technique, a natural language text processing technique, a machine perception technique, a computer vision technique, or the like.

In this way, precision agriculture system 250 may utilize the commodity-related information, the farm-related information, and/or an emergence value, and may determine a recommendation and/or an action to be performed, as described elsewhere herein. Additionally, in this way, precision agriculture system 250 may reduce a need of a user to use user device 210 to perform individual searches for such commodity-related information, to analyze commodity-related information, or the like, thereby conserving processor and/or memory resources of user devices 210.

As further shown in FIG. 8, process 800 may include determining cost information based on the commodity-related information and an emergence value (block 820). For example, precision agriculture system 250 may determine a replanting cost value and a cost of not replanting value based on an emergence value or a set of emergence values. In some implementations, precision agriculture system 250 may determine a total non-emergence area (e.g., an aggregate of one or more emergence areas associated with a particular emergence value and/or emergence issue). For example, precision agriculture system 250 may identify a quantity of emergence areas, that are associated with emergence values that satisfy a threshold (e.g., non-emergence areas), and may determine the total non-emergence area based on the quantity of non-emergence areas (e.g., a quantity of non-emergence areas, an aggregate surface area associated with the non-emergence areas, or the like). As an example, precision agriculture system 250 may identify emergence areas that are associated with emergence values below 50%, and may aggregate surface areas (e.g., hectares) associated with the non-emergence areas (e.g., quantity of non-emergence areas×surface area of a non-emergence area).

In some implementations, precision agriculture system 250 may determine a total non-emergence area replanting cost. A total non-emergence area replanting cost value may include a monetary value associated with replanting each non-emergence area associated with the total non-emergence area. For example, precision agriculture system 250 may determine a quantity of non-emergence areas, and may multiply the quantity of non-emergence areas by a replanting cost (e.g., associated with replanting a non-emergence area), and/or by a replanting factor, as described elsewhere herein. Additionally, or alternatively, precision agriculture system 250 may determine a total surface area (e.g., hectares) of non-emergence areas, and may multiply the total area by a replanting cost (e.g., a replanting cost per hectare), and/or a replanting factor. As an example, assume that the total non-emergence area equals one hundred hectares, that the replanting cost per hectare is $20, and that the replanting factor is one. In this case, precision agriculture system 250 may determine that the total non-emergence area replanting cost value equals $2,000. In this way, precision agriculture system 250 may determine a financial impact of performing a replanting process (e.g., replanting the non-emergence areas).

In some implementations, precision agriculture system 250 may determine a cost of not replanting value (e.g., a cost of doing nothing). For example, precision agriculture system 250 may determine a loss in revenue that may be caused by a decision to not replant a non-emergence area and/or a set of non-emergence areas (e.g., the total non-emergence area). In some implementations, precision agriculture system 250 may determine a cost of not replanting value based on a total non-emergence area (e.g., a quantity of non-emergence areas, a total surface area of the non-emergence areas, or the like), a commodity value (e.g., a market price of the commodity), a commodity yield value, and an assumed loss factor. As an example, assume that the total non-emergence area includes a surface area of one hundred hectares, that the commodity value is $2 per kilogram, and that the commodity yield value is one hundred kilograms per hectare. Further, assume that the assumed loss factor is 10% (e.g., indicating that 90% of the commodity yield value may be harvested and/or sold). In this case, precision agriculture system 250 may determine that the cost of not replanting is $18,000. In this way, precision agriculture system 250 may determine a cost of not replanting value, and may compare the cost of not replanting value and the total non-emergence area replanting cost value, as described below.

As further shown in FIG. 8, process 800 may include determining a condition based on the cost information (block 830), and determining, based on the condition, a recommendation to permit and/or cause an action to be performed (block 840). For example, precision agriculture system 250 may determine a condition based on the cost information, emergence values, and/or emergence issues, and may determine a recommendation to permit and/or cause another device to perform an action.

In some implementations, a condition may include an emergence area being associated with an emergence value that satisfies a threshold (e.g., a non-emergence area). Additionally, or alternatively, a condition may include a quantity of non-emergence areas, associated with a particular area, that satisfies a threshold. As an example, assume that a particular area (e.g., a zone) is associated with multiple emergence areas. Further, assume that 40% of the emergence areas, associated with the particular area, are associated with emergence values that satisfy a threshold (e.g., are non-emergence areas). In this case, precision agriculture system 250 may detect a condition with the particular zone (e.g., an emergence issue). In some implementations, a condition may include an environmental condition. For example, an environmental condition may include a temperature (e.g., that satisfies a threshold, that is within a particular range, that is increasing over a time frame, that is decreasing over a time frame, etc.), a weather event (e.g., rain, hail, snow, sleet, etc.), or the like.

In some implementations, precision agriculture system 250 may determine to provide a recommendation that a particular area, and/or non-emergence areas associated with the particular area, not be replanted based on a condition that an emergence issue does not exist. For example, precision agriculture system 250 may determine a recommendation that a particular area not be replanted based on detecting a condition or a set of conditions. As an example, assume that precision agriculture system 250 determines that a particular area (e.g., a zone) is associated with a quantity, of non-emergence areas, that does not satisfy a threshold (e.g., an emergence issue does not exist). In this case, precision agriculture system 250 may determine a recommendation that the particular area, and/or the non-emergence areas associated with the particular area, not be replanted. As an example, precision agriculture system 250 may provide information that identifies that the particular area is "healthy" (e.g., the zone is not associated with an emergence issue).

In some implementations, precision agriculture system 250 may determine a recommendation that a particular area, and/or non-emergence areas associated with the particular area, not be replanted based on a condition associated with an emergence issue and the cost information. For example, precision agriculture system 250 may detect a first condition associated with an emergence issue (e.g., that a quantity of non-emergence areas satisfies a threshold, that a total non-emergence surface area satisfies a threshold, etc.), and may detect a second condition based on the cost information (e.g., that a total non-emergence area replanting cost value satisfies a cost of not replanting value). In this case, precision agriculture system 250 may determine that each non-emergence area, associated with the total non-emergence area, should not be replanted (e.g., because potential revenue associated with the replanting may not outweigh the costs of replanting).

In some implementations, precision agriculture system 250 may determine a recommendation that a particular area, and/or non-emergence areas associated with the particular area, be replanted based on an emergence issue and the cost information. For example, precision agriculture system 250 may detect a first condition associated with an emergence issue and may detect a second condition (e.g., that a total non-emergence area replanting cost does not satisfy a cost of not replanting). In this case, precision agriculture system 250 may determine that each non-emergence area, associated with the total non-emergence area, should be replanted (e.g., because potential revenue associated with the replanting may outweigh the costs of replanting).

In some implementations, precision agriculture system 250 may determine a recommendation that a particular area, and/or non-emergence areas associated with the particular area, be replanted based on a particular time frame (e.g., at a particular date, during a particular range of days, etc.). For example, precision agriculture system 250 may determine a time frame (e.g., a plant date) based on analyzing commodity prices (e.g., historical commodity prices, current commodity prices, predicted commodity prices, etc.), based on analyzing environmental condition information, based on analyzing growth degree days required for maturity of the commodity, based on analyzing commodity yield values, or the like.

In some implementations, precision agriculture system 250 may determine a recommendation that a particular area not be replanted based on an environmental condition, despite an emergence issue and/or the cost information. For example, precision agriculture system 250 may detect a first condition associated with an emergence issue, and may detect a second condition (e.g., that a total non-emergence area replanting cost does not satisfy a cost of not replanting). However, precision agriculture system 250 may detect a third condition (e.g., an environmental condition, such as a forecast for a particular weather event, a forecast for a particular temperature, a forecast for a change in temperature, etc.), and may determine to a recommendation that the particular area not be replanted based on the third condition. As an example, precision agriculture system 250 may determine that an environmental condition is forecasted (e.g., hail), and may determine a recommendation that the particular area not be replanted (e.g., because the environmental condition may negatively affect the replanting, may negatively affect a yield, etc.).

In some implementations, precision agriculture system 250 may determine the recommendation to permit and/or cause an action to be performed based on the occurrence of an event, such as detecting that the user logged into the PAS application, receiving a request from user device 210, detecting a particular date and/or time, determining a particular set of conditions, or the like. In some implementations, precision agriculture system 250 may provide information that identifies the recommendation, cost information (e.g., total non-emergence area replanting cost values, cost values of not replanting, or the like), information that identifies the particular area and/or non-emergence areas associated with the particular area (e.g., imagery data associated with a farm, field, zone, etc.), locations associated with actual commodities, or the like.

In some implementations, precision agriculture system 250 may determine a recommendation based on a model. For example, precision agriculture system 250 may use machine learning techniques to analyze data (e.g., training data, such as historical data, etc.) and create models to determine recommendations. In some implementations, a model may be generated based on information associated with a first farm (e.g., the information may be used as training data), and may be used to determine a recommendation based on information associated with a second farm. In some implementations, the created models may include models that are specific to a particular farm and models that are generally applicable to all farms.

In some implementations, precision agriculture system 250 may generate more than one model for a particular farm. For example, in some implementations, precision agriculture system 250 may generate one or more models for each field, zone, etc. on the farm. Thus, if a farm is associated with 100 fields, zones, etc., precision agriculture system 250 may generate 100 or more models for the farm. In a situation where a particular field includes more than one commodity, precision agriculture system 250 may generate one or more models for each commodity in the particular field. Once the models have been created, precision agriculture system 250 may further train the models and/or create new models, based on receiving new training data.

In some implementations, precision agriculture system 250 may automatically schedule a service to be performed based on the recommendation. For example, precision agriculture system 250 may schedule an entity (e.g., a company, a group of individuals, an individual, an employee, etc.) to perform a service (e.g., replant a non-emergence area, harvest a particular emergence area, or the like). Additionally, or alternatively, precision agriculture system 250 may automatically cause an order for materials to be placed based on the recommendation (e.g., materials associated with a replanting process, seeds associated with a commodity, herbicides, fungicides, etc.). In some implementations, precision agriculture system 250 may automatically schedule a service to be performed and/or a commodity to be sold (e.g., may schedule a delivery of a commodity, may schedule a sale of a commodity, or the like).

In some implementations, precision agriculture system 250 may automatically cause farming device 260 to perform an action based on the recommendation. For example, precision agriculture system 250 may cause farming device 260 to replant a non-emergence area. As an example, precision agriculture system 250 may provide an instruction to farming device 260 (e.g., associated with a particular network address) that identifies a location associated with a non-emergence area (e.g., geo-coordinates), and causes farming device 260 to perform an action in association with the non-emergence area (e.g., causes a harvester to replant the non-emergence area, causes a UAV to visually inspect the non-emergence area, causes a UAV to spray a chemical, causes a UAV to capture additional imagery data associated with the emergence area, causes an irrigation system to water the non-emergence area, or the like). Additionally, or alternatively, precision agriculture system 250 may cause farming device 260 to perform an action in association with an emergence area (e.g., harvest a commodity, water the emergence area, spray an herbicide in association with the emergence area, or the like).

In some implementations, precision agriculture system 250 may cause a message (e.g., an email or a short message service (SMS) message) to be sent to user device 210 based on the recommendation. In this way, precision agriculture system 250 may notify a user of a particular recommendation, of a particular emergence issue, or the like. Additionally, in this way, precision agriculture system 250 may notify a user of particular information associated with a particular area, with a particular condition, or the like, and may reduce a need of the user to cause user device 210 to perform a search for the information, thereby conserving processing and/or memory resources of user device 210.

In some implementations, precision agriculture system 250 may coordinate user devices 210 based on the recommendation. For example, precision agriculture system 250 may coordinate user devices 210 (e.g., coordinate calendar applications associated with user devices 210 to schedule a meeting, to schedule a work period, or the like), and may provide information identifying the recommendation and/or the particular area associated with the recommendation (e.g., to be displayed in association with a calendar application). In this way, a user may receive an indication that a meeting has been scheduled to discuss the recommendation. Additionally, in this way, precision agriculture system 250 may reduce a quantity of processing needed to identify information associated with the recommendation, thereby conserving processing and/or memory resources of user devices 210.

Additionally, or alternatively, precision agriculture system 250 may cause a budget associated with a farm to be updated based on the recommendation. For example, precision agriculture system 250 may identify a replanting cost value associated with the recommendation, and may cause a budget to be updated to accommodate the replanting cost value (e.g., may allocate resources towards the replanting), to be updated to reflect potential revenue associated with the replanting, or the like. Additionally, or alternatively, precision agriculture system 250 may cause accounting software to be modified.

Additionally, or alternatively, precision agriculture system 250 may permit a user to access text and/or a resource associated with information that was used by precision agriculture system 250 when determining the recommendation. For example, precision agriculture system 250 may provide information (e.g., for display via user device 210) identifying and/or including resources (e.g., webpages, documents, etc.) that include particular information (e.g., commodity value information, environmental condition related information, or the like). In some implementations, precision agriculture system 250 may provide a link, such as a hyperlink, to the information. In this way, precision agriculture system 250 may assist a user in analyzing information that was used when determining the recommendation and/or verifying the accuracy of the recommendation. Additionally, in this way, precision agriculture system 250 may reduce a quantity of processing needed to perform a search for such information, thereby conserving processor and/or memory resources of user device 210.

In some implementations, precision agriculture system 250 may receive additional farm-related information based on providing a recommendation and/or causing an action to be performed. For example, assume that precision agriculture system 250 causes a non-emergence area to be replanted, and/or causes a non-emergence area to be watered and/or sprayed. In this case, precision agriculture system 250 may receive additional farm-related information (e.g., imagery data associated with the non-emergence area). As an example, farming device 260 (e.g., a UAV) may capture additional imagery data associated with the non-emergence area, and may provide the imagery data to precision agriculture system 250.

In some implementations, precision agriculture system 250 may utilize the additional information, and may implement a machine learning technique to update one or more models (e.g., models that may be used to determine recommendations, predict commodity yield values, predict expected commodity quantity values, or the like). In this way, precision agriculture system 250 may identify results of a recommendation, and may provide additional recommendations based on the results (e.g., may alter recommendations, may continue to provide similar recommendations, or the like). In this way, processor and/or memory resources of user devices 210, farming devices 260, and/or precision agriculture system 250 may be conserved by utilizing actual results to determine more accurate recommendations.

As further shown in FIG. 8, process 800 may include receiving information that identifies the recommendation (block 850), and providing the information that identifies the recommendation for display (block 860). For example, user device 210 may receive the recommendation information from precision agriculture system 250 via a network, such as network 270. In some implementations, user device 210 may cause the recommendation information to be provided for display.

As further shown in FIG. 8, process 800 may include receiving an input from a user (block 870), and causing an action to be performed based on the input (block 880). For example, user device 210 may receive an input from a user of user device 210. In some implementations, user device 210 may cause a user interface to be displayed with one or more recommendations. In some implementations, each recommendation may be associated with a financial impact (e.g., a cost associated with replanting, a cost associated with not replanting, etc.) of performing or not performing the recommended course of action. In some implementations, the action may include an action similar as described above in connection with block 840 (e.g., causing a non-emergence area to be replanted, or the like).

In this way, precision agriculture system 250 may provide information that identifies a recommendation, which may enable a user to identify particular courses of action and/or assess a health of a particular area of a farm (e.g., based on emergence values). In this way, implementations described herein may enable farming operations to be performed based on accurate information, thereby conserving processor and/or memory resources of farming devices 260 by reducing a quantity of imprudent farming operations. Additionally, implementations described herein may reduce a need of a user to cause user device 210 to perform searches for various information and/or determine financial impacts of various farming operations, thereby conserving processor and/or memory resources of user device 210.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

In some implementations, processes 400, 600, 800, and/or some combination thereof may be performed independently. Alternatively, processes 400, 600, 800 and/or some combination thereof may be performed dependently, concurrently, serially, and/or in parallel. In some implementations, processes 400, 600, 800 and/or some combination thereof may be performed by one or more devices of FIG. 2. Additionally, or alternatively, one or more of processes 400, 600, and/or 800 may be performed by a single device or by multiple different devices.

FIGS. 9A-9J are diagrams of an example implementation 900 relating to example process 800 shown in FIG. 8. FIGS. 9A-9J show an example of determining a recommendation based on an emergence value of a commodity and permitting and/or causing an action to be performed based on the recommendation.

Figure 9A:
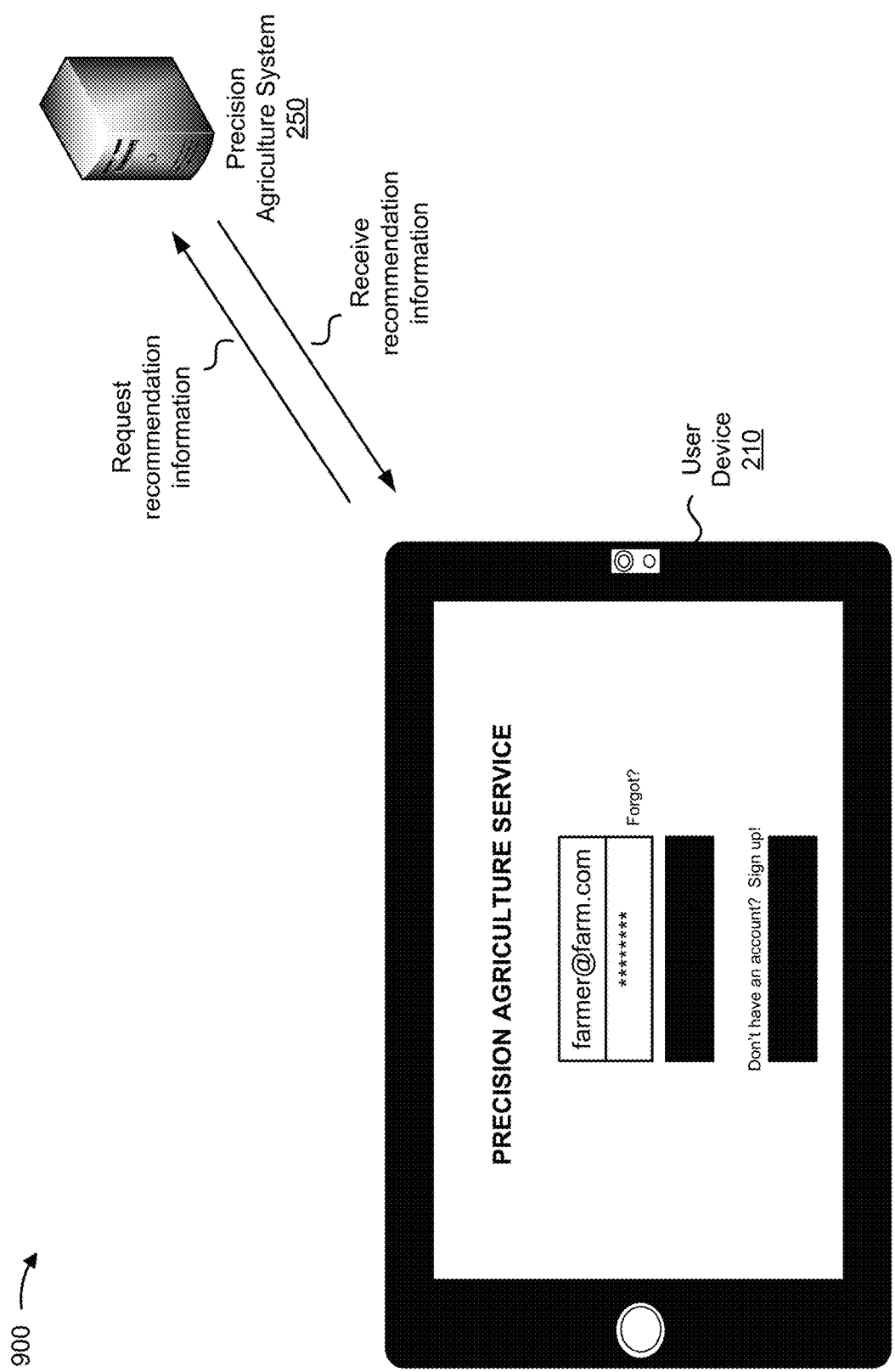

As shown in FIG. 9A, assume that precision agriculture system 250 provides a user interface to user device 210 to allow a user to obtain recommendations. As shown, assume that the user logs into a PAS service by entering a user name and password. Based on selecting the log in button on user device 210, user device 210 may send a request for information associated with a recommendation to precision agriculture system 250. The request may include the user's log in information. Precision agriculture system 250 may validate the user's log in information and, once validated, send information relating to the farm(s) with which the user is associated.

Figure 9B:
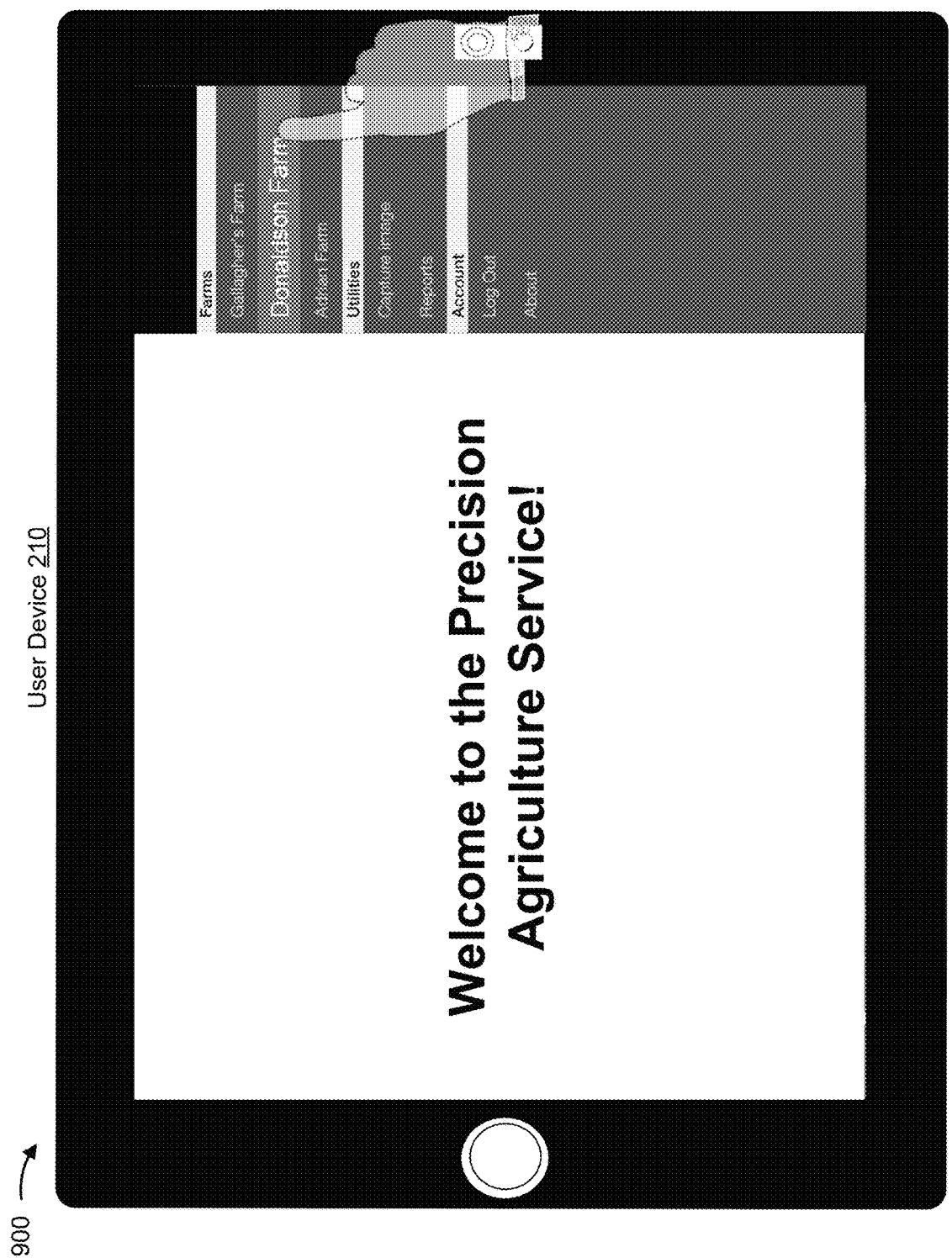
Figure 9C:
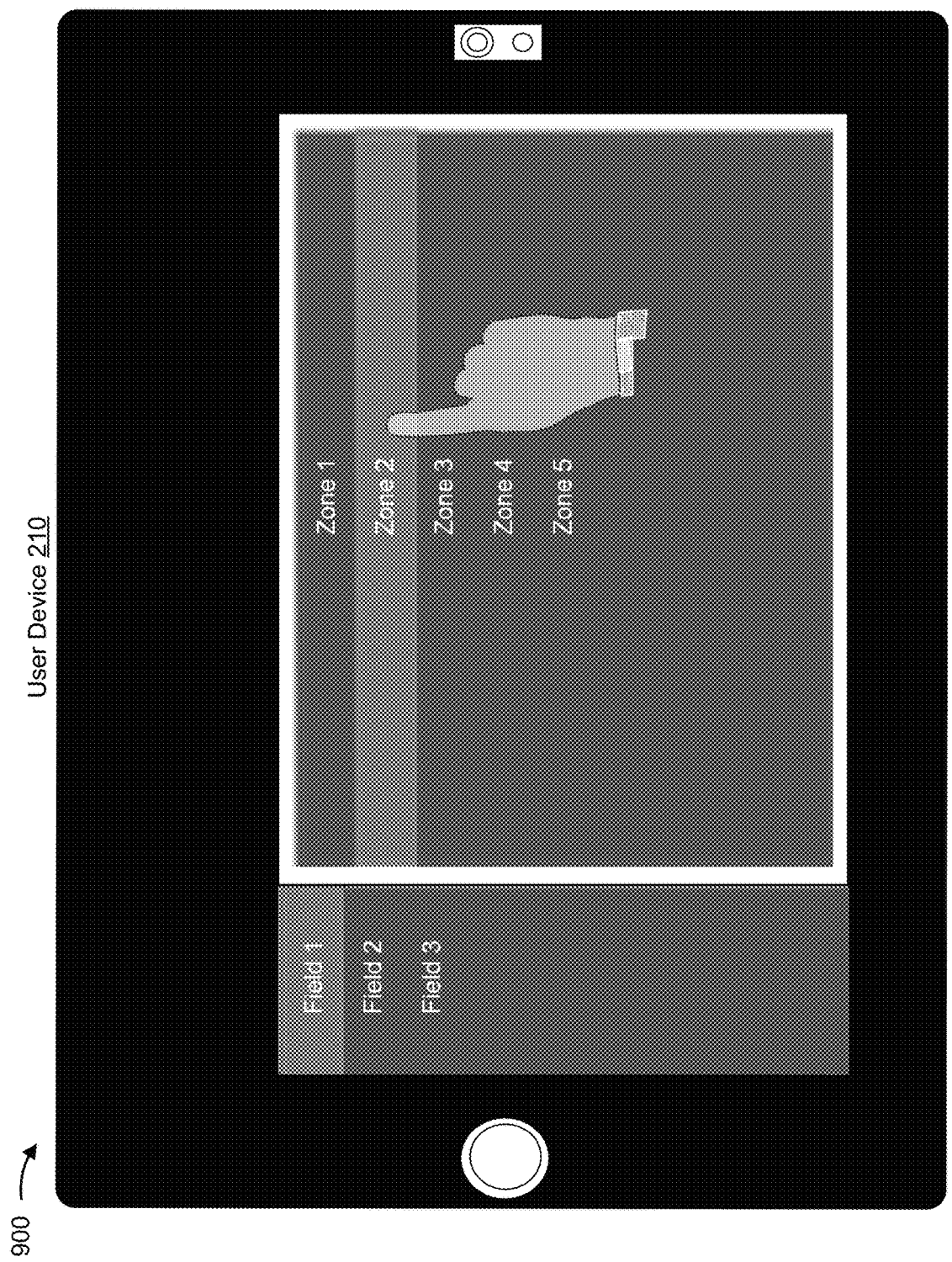

As shown in FIG. 9B, user device 210 provides, for display, a welcome screen and a list of farms with which the user is associated. As shown, assume that the user selects Donaldson farm. With reference to FIG. 9C, user device 210 provides, for display, a user interface that includes information associated with Donaldson farm. For example, user device 210 may provide, for display, a list of fields associated with Donaldson farm, and may provide, for display, a list of zones associated with respective fields. For example, as shown, assume that the user selects a particular field (e.g., Field 1). As shown, user device 210 may provide, for display, a list of zones associated with the Field 1. As shown, assume that the user selects Zone 2.

Figure 9D:
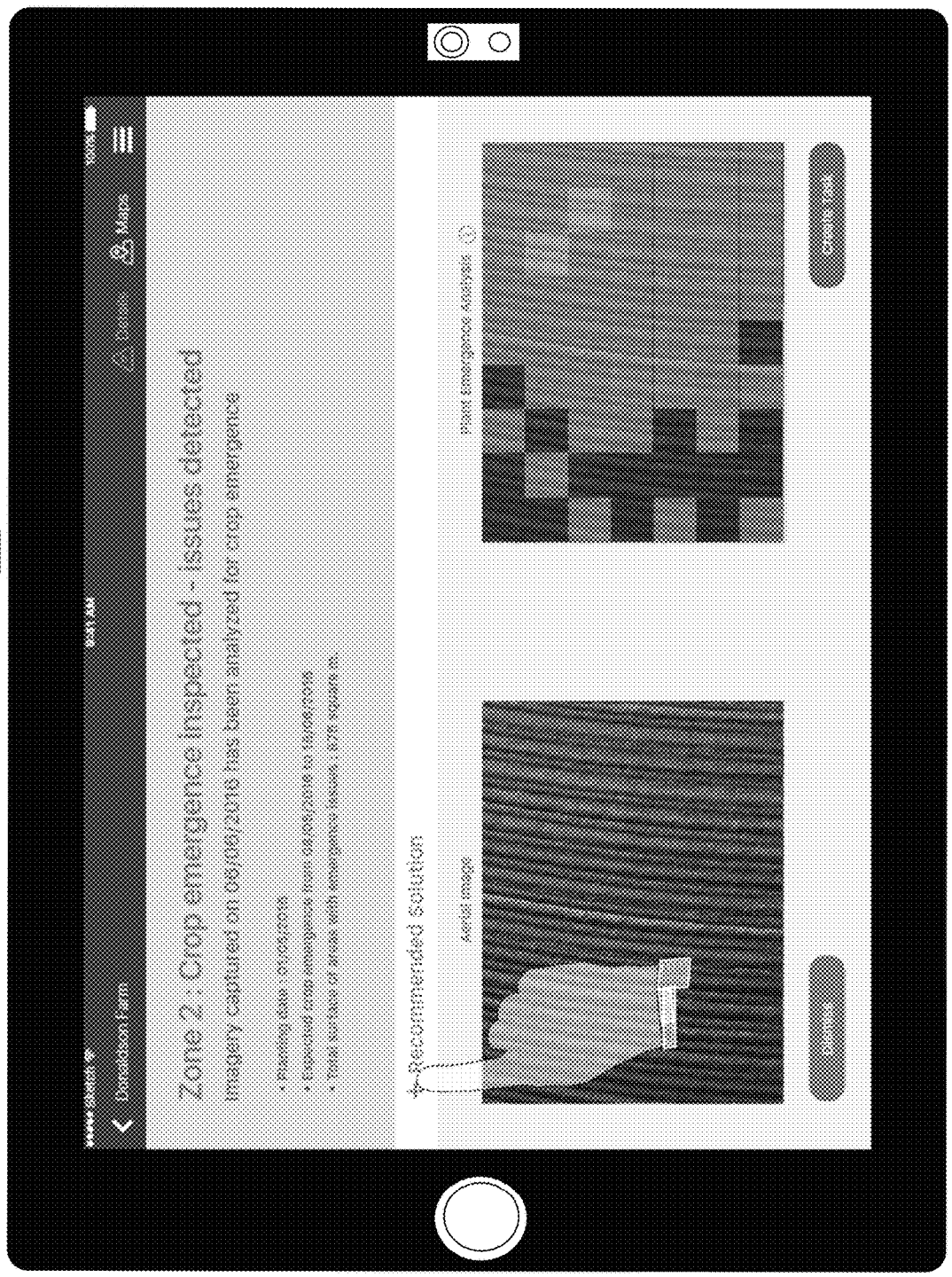

As shown in FIG. 9D, user device 210 may provide, for display, information associated with Zone 2. For example, as shown, user device 210 provides, for display, an aerial image associated with Zone 2, and provides, for display, a heat map corresponding to Zone 2. Additionally, as shown, user device 210 provides, for display, a total surface area of emergence areas associated with emergence issues (e.g., a total non-emergence area). As shown, assume that the user interacts with a recommended solution icon.

Figure 9E:
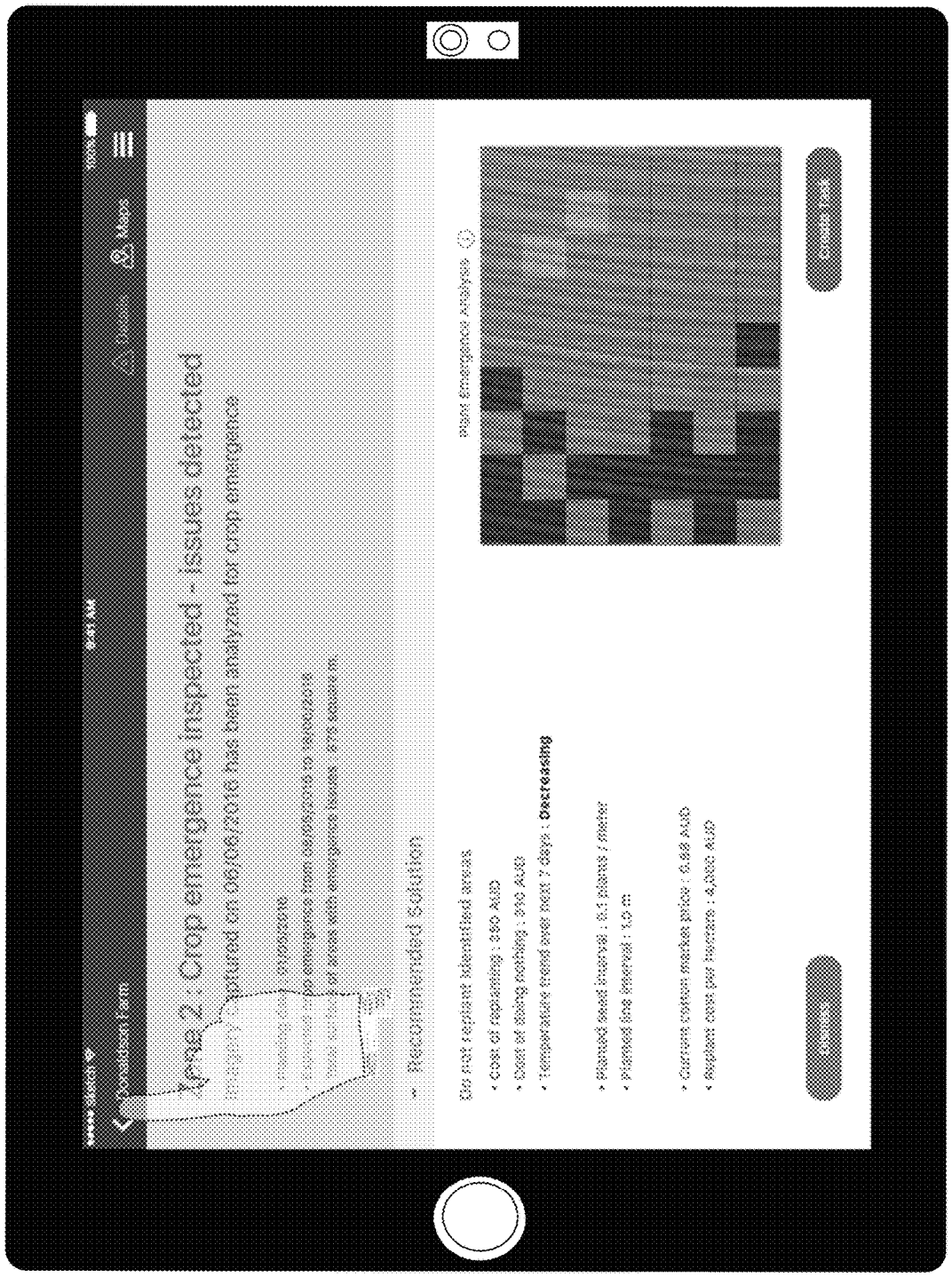

As shown in FIG. 9E, user device 210 may provide, for display, information associated with a recommendation. For example, as shown, user device 210 may provide, for display, a replanting cost value (e.g., 350 AUD), a cost of not replanting value (e.g., 310 AUD), environmental condition information, a current commodity value, etc. As shown, user device 210 may provide a recommendation that non-emergence areas associated with Zone 2 should not be replanted (e.g., because the cost of replanting may not outweigh the benefits of replanting). As shown, assume that the user interacts with a back menu icon.

Figure 9F:
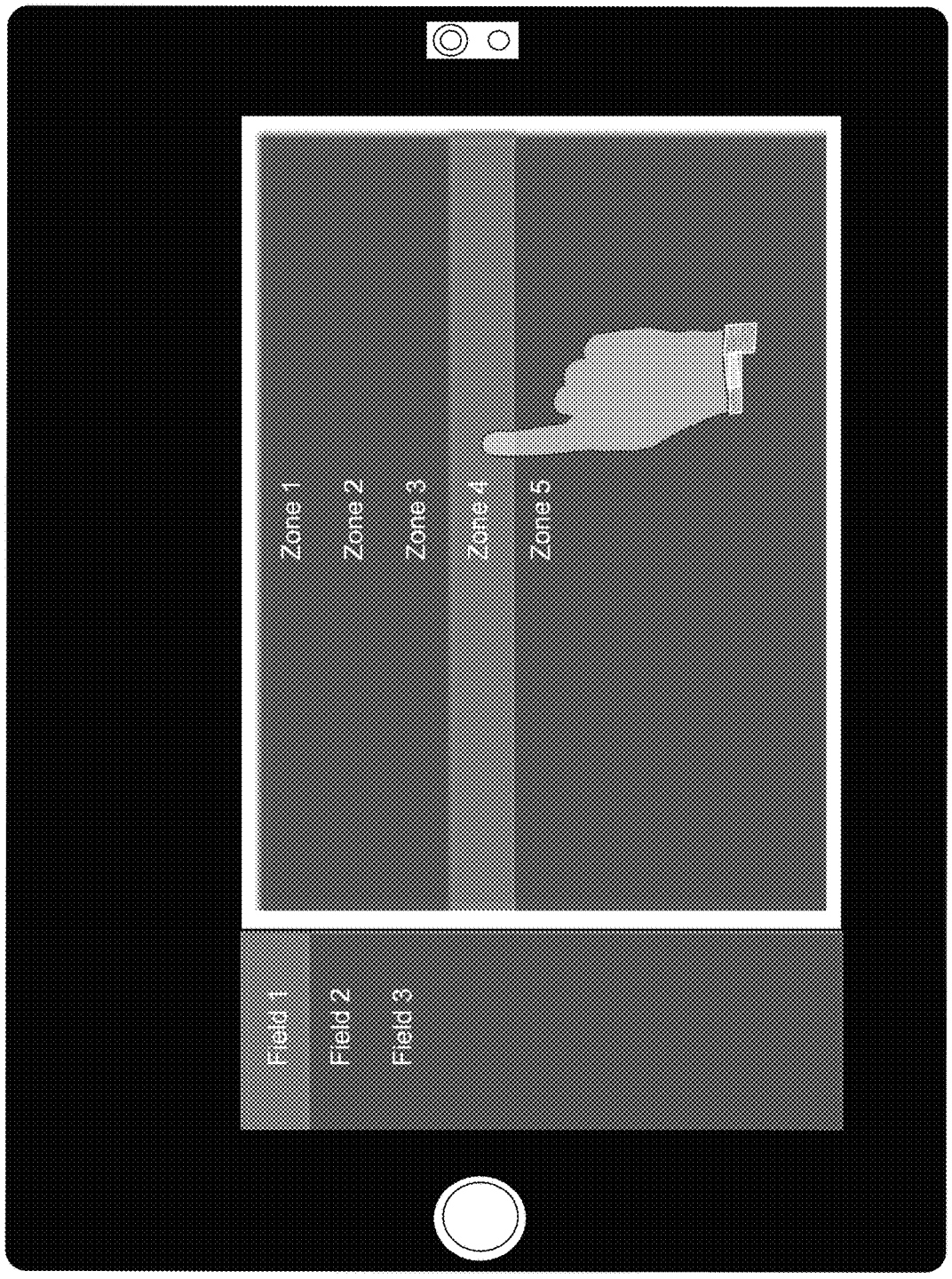
Figure 9G:
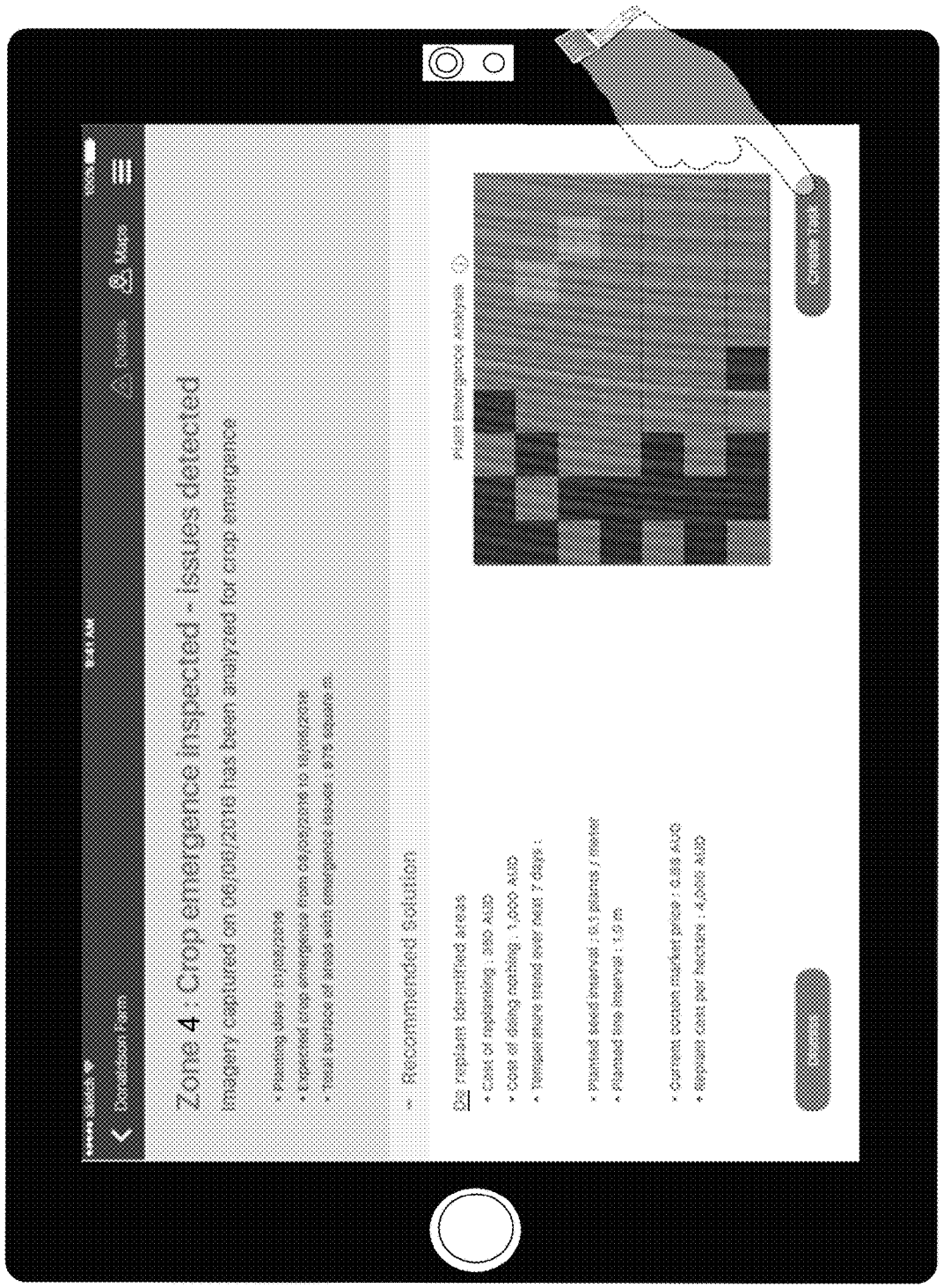

As shown in FIG. 9F, user device 210 may provide, for display, the list of zones associated with Field 1 based on the user interaction. As shown, assume that the user selects Zone 4. With reference to FIG. 9G, user device 210 may provide, for display, information associated with Zone 4 (e.g., a recommendation). For example, as shown, user device 210 may provide, for display, a replanting cost value (e.g., 350 AUD), a cost of not replanting value (e.g., 1000 AUD), etc. As shown, user device 210 may provide, for display, a recommendation that non-emergence areas associated with Zone 4 should be replanted (e.g., because the benefit of replanting may outweigh the cost of replanting). As shown, assume that the user interacts with a Create Task icon.

Figure 9H:
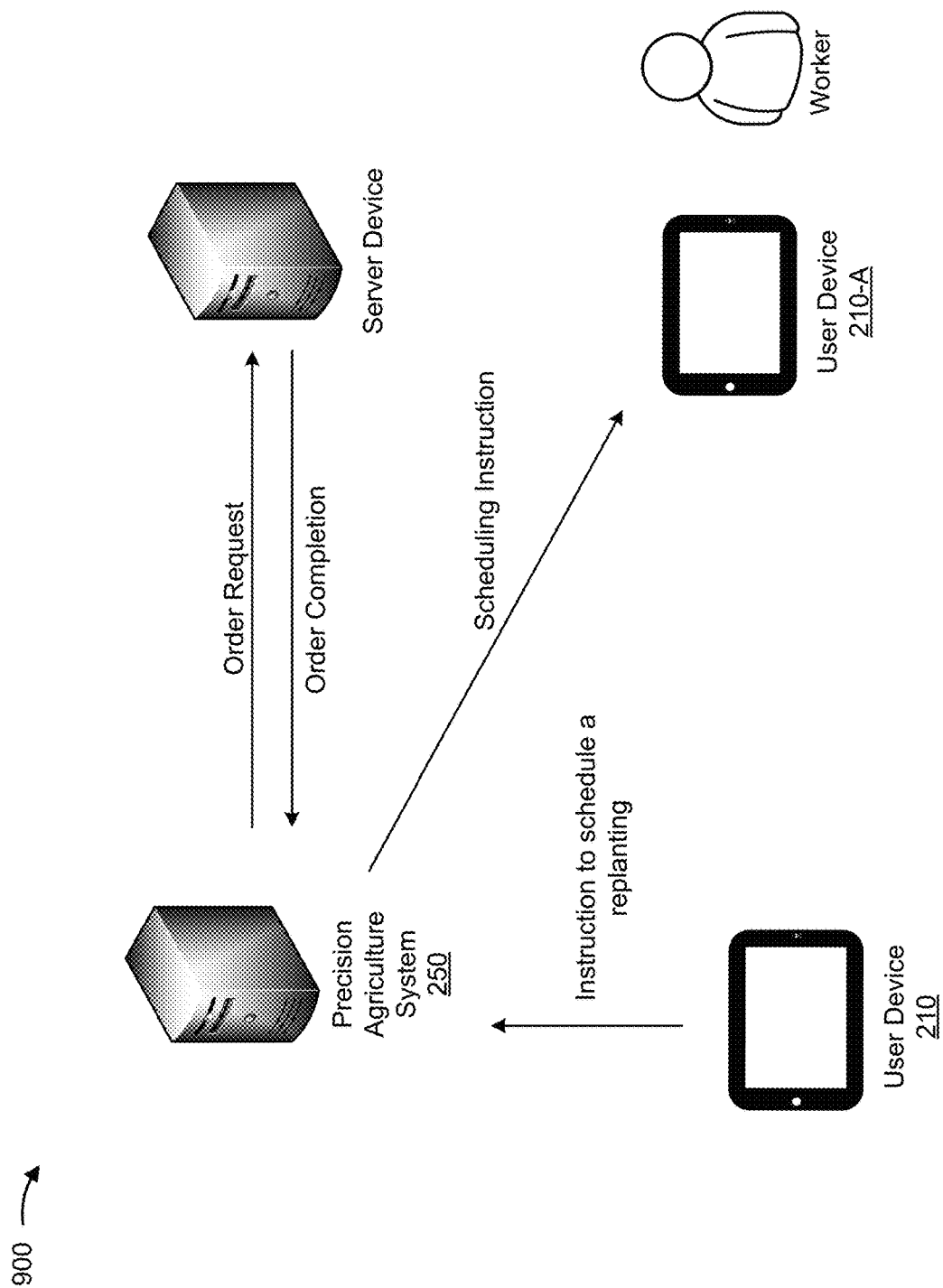

As shown in FIG. 9H, assume that the user selects a particular task indicating that the non-emergence areas associated with Zone 4 be replanted. Assume that user device 210 sends an instruction, to precision agriculture system 250, to schedule a replanting of the non-emergence areas. Based on receiving the instruction, precision agriculture system 250 may send an order request for materials associated with the replanting (e.g., to a server device relating to an entity associated with replanting materials). As shown, precision agriculture system 250 may receive, from the server device, information that identifies that the order request is complete. As shown, precision agriculture system 250 may provide, to another server device and/or user device 210-A, a scheduling instruction. As an example, precision agriculture system 250 may provide a scheduling instruction to coordinate a calendar application of user device 210-A (e.g., associated with a worker) to schedule a replanting.

Figure 9I:
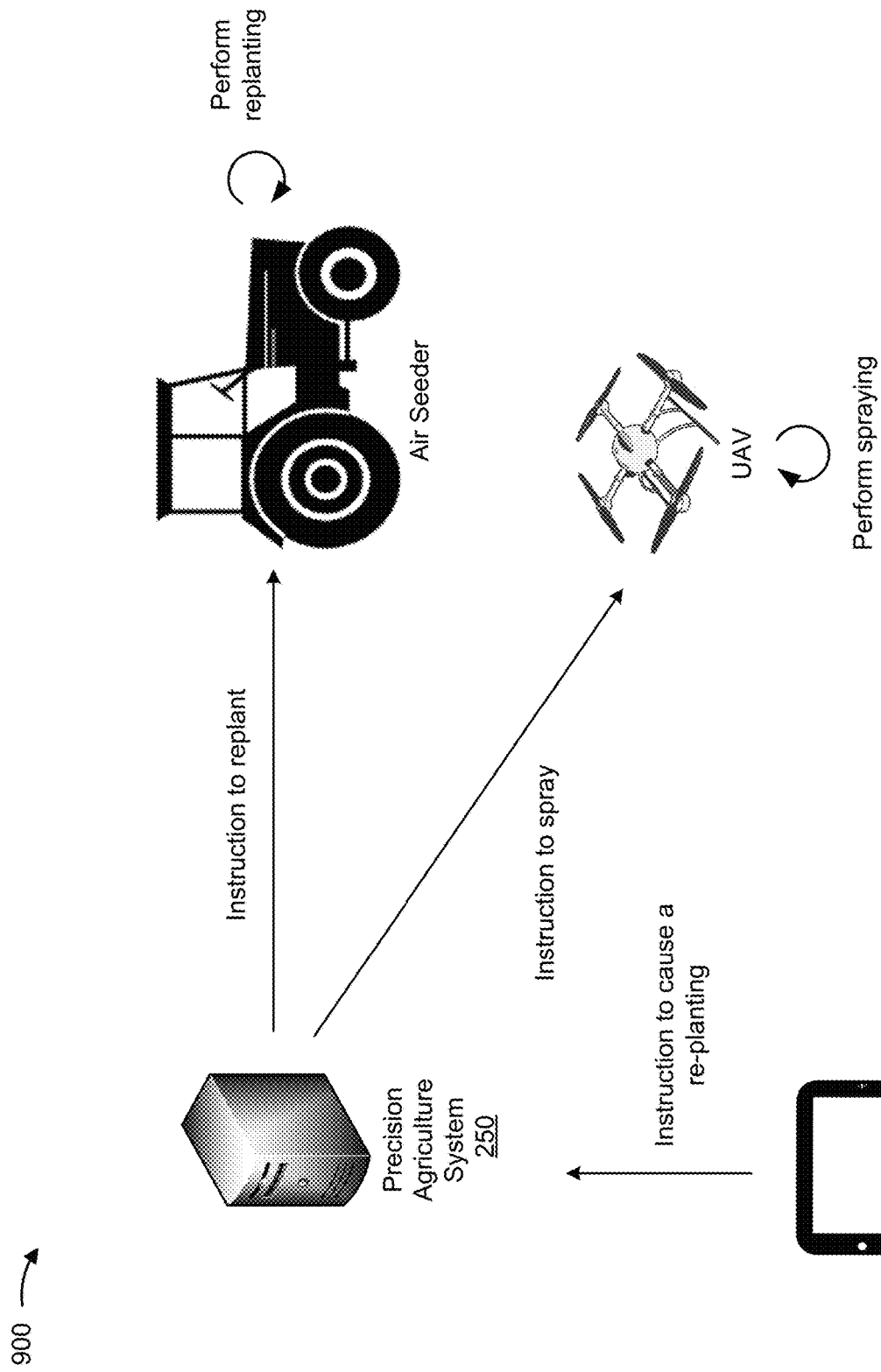

As shown in FIG. 9I, user device 210 may provide, to precision agriculture system 250, an instruction to cause a re-planting of the non-emergence areas associated with Zone 4. Based on receiving the instruction, precision agriculture system 250 may identify farming devices 260 to perform the replanting and/or tasks associated with the replanting. As shown, precision agriculture system 250 may identify a particular farming device 260 (e.g., an air seeder) to perform the replanting, and may cause farming device 260 to perform the replanting of Zone 4. For example, precision agriculture system 250 may provide coordinates associated with each non-emergence area of Zone 4, which may enable farming device 260 to identify particular areas of Zone 4 that need to be replanted. Additionally, as shown, precision agriculture system 250 may provide an instruction to another farming device 260 (e.g., a UAV) to perform a spraying of a chemical, such as a fungicide, herbicide, or the like, of Zone 4 and/or the replanted areas. The instruction may cause farming device 260 to perform the spraying.

As shown in FIG. 9J, user device 210 may provide an instruction to turn on a particular farming device 260 (e.g., an irrigation system) for a particular period of time. Based on receiving the instruction, precision agriculture system 250 may identify a network address of farming device 260 and may cause farming device 260 to be turned on by sending an instruction to turn on the irrigation system. As shown, farming device 260 (e.g., an irrigation system) may irrigate the replanted area. Once the time frame has lapsed, precision agriculture system 250 may send an instruction to turn the irrigation system off.

In this way, precision agriculture system 250 may provide, to user device 210, information that identifies a recommendation in association with a particular area (e.g., a non-emergence area). Based on the recommendation, precision agriculture system 250 may receive information identifying particular instructions, and may provide the instructions to farming devices 260 (e.g., to perform an action in association with the recommendation).

As indicated above, FIGS. 9A-9J are provided merely as an example. Other examples are possible and may differ from what was described with regard to FIGS. 9A-9J.

Implementations described herein enable a precision agriculture system to receive information from various sources, analyze the information, and generate a recommendation based on the analyzed information. In this way, implementations described herein enable prudent farming operations to be performed, and may reduce a quantity of imprudent farming operations from being performed and/or may reduce a need of a user to perform individual searches for information and/or analyze the information. In this way, implementations described herein may conserve processor and/or memory resources of user devices and farming devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory; and
   one or more processors to:
      receive first information associated with an emergence area,
         the first information including information identifying a quantity of seeds planted;
      determine an expected quantity value of a commodity based on the first information;
      receive imagery data of the emergence area;
      determine an actual quantity value of the commodity based on the imagery data;
      determine an emergence value, associated with the emergence area, based on the expected quantity value of the commodity and the actual quantity value of the commodity;
      receive second information associated with the commodity,
         the second information including a replanting cost value associated with the emergence area;
      determine one or more conditions based on the second information and the emergence value;
      determine a recommendation based on the one or more conditions; and
      provide the recommendation to permit and/or cause an action to be performed in association with the emergence area.

2. The device of claim 1, where the one or more processors are further to:

identify a plurality of commodities based on the imagery data,
   each commodity, of the plurality of commodities, being associated with a quantity of pixels associated with the imagery data,
   the quantity of pixels satisfying a threshold; and
where the one or more processors, when determining the actual quantity value of the commodity, are to:
   determine the actual quantity value of the commodity based on the plurality of commodities.

3. The device of claim 1, where the one or more processors are further to:
determine a cost of not replanting value based on the second information and the first information; and
where the one or more processors, when determining the recommendation, are to:
   determine the recommendation based on the replanting cost value and the cost of not replanting value.

4. The device of claim 1, where the one or more processors are further to:
identify a set of pixels based on the imagery data,
   a pixel, of the set of pixels, including a value that satisfies a threshold;
determine a first size of the pixel;
compare the first size and a second size,
   the second size being associated with a ground sample distance of the imagery data;
identify the commodity based on comparing the first size and the second size; and
where the one or more processors, when determining the actual quantity value of the commodity, are to:
   determine the actual quantity value of the commodity based on identifying the commodity.

5. The device of claim 1, where the one or more processors are further to:
cause an unmanned aerial vehicle to perform the action in association with the emergence area.

6. The device of claim 1, where the one or more processors are further to:
determine an environmental condition; and
where the one or more processors, when determining the recommendation, are to:
   determine the recommendation based on the environmental condition.

7. The device of claim 1, where the one or more processors are further to:
identify a line interval value and a seed interval value based on the first information; and
where the one or more processors, when determining the expected quantity value of the commodity, are to:
   determine the expected quantity value of the commodity based on the line interval value and the seed interval value.

8. A non-transitory computer-readable medium storing instructions, the instructions comprising:
one or more instructions that, when executed by one or more processors of a device, cause the one or more processors to:
   receive first information associated with an emergence area,
      the first information identifying a quantity of seeds planted;
   determine an expected quantity value of a commodity based on the first information;
   receive imagery data of the emergence area;
   determine an actual quantity value of the commodity based on the imagery data,
      the actual quantity value of the commodity including a quantity of identified commodities within the imagery data,
      each commodity, of the identified commodities, being associated with a quantity of pixels, relating to the imagery data, that satisfies a first threshold,
      a pixel, of the quantity of pixels, including a value that satisfies a second threshold;
   compare the actual quantity value of the commodity and the expected quantity value of the commodity;
   determine an emergence value based on comparing the actual quantity value of the commodity and the expected quantity value of the commodity;
   receive second information associated with the commodity,
      the second information including a replanting cost value associated with the emergence area and
   provide a recommendation, based on the emergence value and the second information, to permit and/or cause an action to be performed in association with the emergence area.

9. The non-transitory computer-readable medium of claim 8, where the one or more instructions, when executed by the one or more processors, further cause the one or more processors to:
determine the first threshold based on a ground sample distance of the imagery data; and
where the one or more instructions, that cause the one or more processors to determine the actual quantity value of the commodity, cause the one or more processors to:
   determine the actual quantity value of the commodity based on the ground sample distance of the imagery data.

10. The non-transitory computer-readable medium of claim 8, where the one or more instructions, when executed by the one or more processors, further cause the one or more processors to:
determine a size of the emergence area;
determine the replanting cost value based on the size of the emergence area and the emergence value; and
determine the recommendation based on the replanting cost value.

11. The non-transitory computer-readable medium of claim 8, where the one or more instructions, when executed by the one or more processors, further cause the one or more processors to:
generate a heat map based on the emergence value; and
provide, to another device, third information that identifies the heat map to permit the other device to display the third information.

12. The non-transitory computer-readable medium of claim 8, where the one or more instructions, when executed by the one or more processors, further cause the one or more processors to:
determine the expected quantity value of the commodity based on the quantity of seeds planted.

13. The non-transitory computer-readable medium of claim 8, where the one or more instructions, when executed by the one or more processors, further cause the one or more processors to:
determine a plurality of locations associated with the identified commodities; and
where the one or more processors, when providing the recommendation, are to:
   provide, in association with the recommendation, information that identifies the plurality of locations.

14. The non-transitory computer-readable medium of claim 8, where the one or more instructions, when executed by the one or more processors, further cause the one or more processors to:
- receive, from another device, information associated with a commodity value; and
- determine the recommendation based on the commodity value.

15. A method, comprising:
- receiving, by a first device and from a second device via a network, first information associated with an emergence area of a farm,
  - the first information including information identifying a quantity of seeds planted;
- determining, by the first device, an expected quantity value of a commodity based on the information;
- receiving, by the first device, imagery data of the emergence area;
- determining, by the first device, an actual quantity value of the commodity based on the imagery data;
- determining, by the first device, an emergence value, associated with the emergence area, based on the expected quantity value of the commodity and the actual quantity value of the commodity;
- receiving, by the first device, second information associated with the commodity,
  - the second information including a replanting cost value associated with the emergence area; and
- causing, by the first device, a third device to perform an action in association with the emergence area based on the emergence value and the second information.

16. The method of claim 15, further comprising:
- causing a farming device to replant the emergence area based on the emergence value.

17. The method of claim 15, further comprising:
- identifying a set of pixels based on the imagery data,
  - the set of pixels including values that satisfy a first threshold value;
- determining a size of the set of pixels;
- determining that the size satisfies a second threshold value;
- identifying the commodity based on the size satisfying the second threshold value; and
- where determining the actual quantity value of the commodity comprises:
  - determining the actual quantity value of the commodity based on the size satisfying the second threshold value.

18. The method of claim 15, further comprising:
- determining a size of the emergence area;
- determining a commodity yield value;
- determining a cost of not replanting value based on the size of the emergence area and the commodity yield value; and
- where causing the third device to perform the action comprises:
  - causing the third device to perform the action based on the cost of not replanting value.

19. The method of claim 15, further comprising:
- receiving information that identifies a planting date value;
- identifying a time frame based on the imagery data;
- determining that the time frame satisfies a threshold based on the planting date value; and
- where determining the actual quantity value of the commodity comprises:
  - determining the actual quantity value of the commodity based on the time frame satisfying the threshold.

20. The method of claim 15, further comprising:
- receiving information associated with a plurality of commodity values;
- determining a plant date based on the plurality of commodity values; and
- where causing the third device to perform the action comprises:
  - causing the third device to perform the action based on the plant date.

\* \* \* \* \*